United States Patent
Kereszy et al.

(10) Patent No.: US 12,352,920 B2
(45) Date of Patent: Jul. 8, 2025

(54) SYSTEM AND METHOD FOR DETECTING HIGH-RISK LIGHTNING STRIKES FOR USE IN PREDICTING AND IDENTIFYING WILDFIRE IGNITION LOCATIONS

(71) Applicant: HELIOS POMPANO, INC., Pompano Beach, FL (US)

(72) Inventors: Tamas Kereszy, Pompano Beach, FL (US); Istvan Kereszy, Pompano Beach, FL (US)

(73) Assignee: HELIOS POMPANO, INC., Gainesville, FL (US)

(*) Notice: Subject to any disclaimer, the term of this patent is extended or adjusted under 35 U.S.C. 154(b) by 286 days.

(21) Appl. No.: 17/857,155

(22) Filed: Jul. 4, 2022

(65) Prior Publication Data

US 2023/0011424 A1    Jan. 12, 2023

Related U.S. Application Data

(60) Provisional application No. 63/263,886, filed on Nov. 11, 2021, provisional application No. 63/203,238, (Continued)

(51) Int. Cl.
    *G01W 1/16*    (2006.01)
    *G01S 5/16*    (2006.01)
    *G08B 21/10*    (2006.01)

(52) U.S. Cl.
    CPC ............... *G01W 1/16* (2013.01); *G01S 5/16* (2013.01); *G08B 21/10* (2013.01)

(58) Field of Classification Search
    CPC . G01W 1/16; G01S 5/16; G08B 21/10; G08B 17/005; G08B 17/125; G08B 31/00
See application file for complete search history.

(56) References Cited

U.S. PATENT DOCUMENTS 6,674,625 B1 *  1/2004  Page .................. G01W 1/16
                                        361/111
9,557,720 B1 *  1/2017  Woods ............... G01R 31/085
(Continued)

FOREIGN PATENT DOCUMENTS

| | | |
|---|---|---|
| CA | 2415603 A1 | 7/2004 |
| CN | 112907871 A | 8/2021 |
| WO | 2013/006259 A1 | 1/2013 |

OTHER PUBLICATIONS

FPGAS in Edge Computing, Sep. 6, 2023, 20 pages, https://fpgainsights.com/fpga-in-edge-computing/ (Year: 2023).*

(Continued)

*Primary Examiner* — Tung S Lau
(74) *Attorney, Agent, or Firm* — DANIEL S. POLLEY, P.A.

(57) ABSTRACT

A system and method for detecting in real-time high risk lightning (HRL) strikes and sending out alerts to responsible personnel to allow for earlier responses to lightning caused fire ignitions to help maintain and/or reduce the chance of spread by the wildfire. The system and method allow for HRL events and fire ignitions to be detected preferably within seconds. The system and method can use a network of detectors, data from environmental satellites and/or other environmental data sources, and novel AI/algorithms for signal processing to relatively quickly locate fire ignition spots. Thus, the system and method provide for actionable wildfire intelligence in real-time and to relatively quickly and accurately send out alerts when an HRL event has been determined. Cameras and drones can be used to provide real-time visualization at the location of the HRL event to verify or monitor any fire ignition or smoldering at the area of the HRL event.

22 Claims, 21 Drawing Sheets

Related U.S. Application Data filed on Jul. 14, 2021, provisional application No. 63/218,423, filed on Jul. 5, 2021.

(56) References Cited

U.S. PATENT DOCUMENTS

| | | | |
|---|---|---|---|
| 2005/0197776 A1* | 9/2005 | Makela | G01W 1/16 702/4 |
| 2018/0321422 A1 | 11/2018 | Stock et al. | |
| 2019/0187197 A1 | 6/2019 | Murphy et al. | |
| 2020/0159397 A1 | 5/2020 | Tohidi | |

OTHER PUBLICATIONS

PCT International Search Report for PCT Patent Application No. PCT/IB2022/056191 issued Jan. 26, 2023.
PCT Written Opinion for corresponding PCT Patent Application No. PCT/IB2022/056191 issued Jan. 26, 2023.
Partial International Search for corresponding PCT Patent Application No. PCT/IB2022/056191 issued Oct. 17, 2022.

* cited by examiner

SYSTEM AND METHOD FOR DETECTING HIGH-RISK LIGHTNING STRIKES FOR USE IN PREDICTING AND IDENTIFYING WILDFIRE IGNITION LOCATIONS

This application claims the benefit of and priority to U.S. Application Ser. No. 63/263,886, filed Nov. 11, 2021, U.S. Application Ser. No. 63/203,238, filed Jul. 14, 2021, and U.S. Application Ser. No. 63/218,423, filed Jul. 5, 2021, all of the above-identified applications and any accompanying documentations filed along with one or more of the applications are incorporated by reference in their entireties as if fully set forth herein and for all purposes.

1. FIELD OF THE DISCLOSURE

The disclosure relates generally to forest fire identifications and more particularly to a novel detection system for identifying wildfire locations based on lightning strike detection.

2. BACKGROUND

Lightning is the number one cause of wildfires in terms of area burned across the Western US where over 70% of the area is burned due to lightning-initiated fires, and in Australia where over 80% of the area burned is due lightning-initiated fires. It is also a major concern in forests and natural habitats throughout Florida, and in other parts of the world. It is costly, time consuming, and impractical to investigate each lightning strike point as a possible fire ignition location because there are millions of lightning strikes across the US each year. Many lightning-initiated fires go unnoticed for extended times and become so large that they are difficult, dangerous, and costly to suppress.

It is believed that less than 5% of the lightning strikes can ignite fires. These High-Risk-Lightning strikes tend to have long continuing-current and large charge-transfer. These two factors are directly related to heating processes during the electric discharge. Thus, they directly increase fire ignition risk. Standard lightning locating systems ("LLSs") do not have the capability of directly measuring the duration of the lightning current or the charge transfer. LLSs map lightning in two dimensions which leads to less precise detection of lightning strike location and provides little or no information about the cloud charge structure.

Current satellite-assisted technologies rely on optical emissions from lightning strikes to determine the current duration. This involves two steps: (1) the number of subsequent frames with an image brightness above the threshold level is calculated (i.e. measure how long the lightning channel is visible on the satellite images); (2) then the satellite-based detection location is connected with the nearest ground-based detection location. Ground-based networks have less spatial error. This two-step process that relies on satellite data for current-duration information and ground-based data for location information only works when the light is not scattered by the thundercloud too much before reaching the satellite (e.g. Geostationary Lightning Mapper) sensor. When the light is scattered by the cloud, the long-continuing-current ("LCC") is inaccurately detected (i.e. incorrect duration) or not detected at all.

Fire camera systems are being built out on a large scale to monitor forests and detect fires. However, camera systems are inefficient and slow at detecting fire ignitions because their pan, tilt, and zoom (PTZ) capabilities are usually underutilized. Operators only zoom in on fires once they spotted them on the full-scale camera image, which means that the zoom capabilities (often 60× optical zoom) are effectively unused for early fire detection.

In addition, drone fleets are being deployed both to verify fire ignitions and to aid in extinguishing the fires. Continuous monitoring of large areas is difficult and expensive. It also poses legislative concerns as aerial monitoring by numerous drones is often perceived as an invasion of privacy.

The novel system and method described herein for identifying wildfire initiation locations based on lightning strike detections is directed to overcoming, or at least reducing, the problems described above for current detection systems, as well as providing additional benefits and advantages over the above described current detection systems.

SUMMARY OF THE DISCLOSURE

Generally disclosed is a system and method for detecting high risk lightning (HRL) strikes for use in identifying possible locations (e.g. forest, etc.) for a wildfire from the HRL strike to allow for an earlier response to a wildfire by first responders (e.g. firefighters, etc.) to help maintain and/or reduce the chance of spread by the wildfire. Using the disclosed novel system and method wildfires can be detected preferably within seconds. The system and method can use a network of detectors, data from environmental satellites and/or other environmental data sources, and novel AI/algorithms for signal processing to relatively quickly locate fire ignition spots. Thus, the system and method provide for actionable wildfire intelligence in real-time and to relatively quickly and accurately send out alerts, notifications, warnings, etc. (collectively "alert" or "alerts") when an HRL event occurs. Thus, the novel system and method allows for alerts to be sent out even before there is visible signs of a fire. This early detection and notification allow for decreases in firefighting costs, utility company losses, insurance payouts, etc.

The HRL detectors providing multiple lightning strike data feeds and the preferred AI based selection algorithm (associated with a central processing server) enable real-time HRL detection. The HRL detectors can be preferably placed 20 km apart, in the geographical area (i.e. forest, parks, jungle, etc.) to be monitored for lightning ignited fires. Though 20 km apart is preferred, such is not considered limiting and smaller and larger dimensions, such as, but not limited to 30 km apart can be used and are considered within the scope of the disclosure. The distance between the detectors chosen is preferably chosen to allow the detectors to maintain their ability to map lightning in 3D to provide for superior location accuracy, detect long-continuing current, and report electric charge transfer.

In one non-limiting embodiment, the system and method can use a multi-messenger approach where many different input data can be used to select the lightning strikes that pose a high fire risk. A relatively large set of inputs can be used to train the AI component of the system, apply lightning science, and use astrophysical selection algorithms to find high-risk-lightning (HRL) strikes. The novel system and method described herein provides for a major improvement over traditional lightning detectors as the system and method delivers actionable intelligence by preferably selecting those 1-5% of the strokes that present a high risk of ignition and preferably assigning a risk profile to each lightning stroke.

Though not considered limiting, the system can use the NOAA GLM lightning satellite to cross-corroborate potential fires with a real-time lightning database. The system can also use multiple bands to differentiate between regions of cloud and no-cloud to allow for higher accuracy. Though also not considered limiting, the system can scan for fires every 5 minutes. Other smaller and/or larger scanning time periods can be used and are also considered within the scope of the disclosure.

The more input the better and allows the system and method to be tailored to the intended user's needs. If some of the data fields are not available, the system and method is able to work around not having such data. Below is an indicative, though non-limiting, list for input data, though the system and method described herein can use more or less data than the data fields indicated below.

Data Fields:

1, Lightning Data: It is preferred to have lightning parameters such as current duration, charge transfer, peak current, polarity, luminosity waveshape, electromagnetic waveshape and stroke multiplicity.

2, Weather: Temperature, precipitation, humidity, wind, insolation. The input data can have high spatial and time resolution (e.g. hourly data with 1 km resolution) and can be downloaded in real-time through an API.

3, Vegetation and Fuel: Vegetation data such as NDVI and fuel data such as the data from LANDFIRE can be used. Fuel condition data such as 1, 10, 100. 1000 hour fuel moistures, energy release components and ignition components can also be used.

4, Fire data: Real-time data and preferably also historical data. Real-time fires can be provided using GOES-16, Himawari-8, MODIS, and VIIRS. Historic data from higher resolution satellites such as LandSat can also be provided. Other sources for the real-time fire data and/or the historical data can be used and are also considered within the scope of the disclosure.

Also disclosed is a novel process for triggering fire cameras using real-time lightning data as triggers for the Pan-Tilt-Zoom (PTZ) cameras, and the data can also be used for triggering and controlling aerial drones. The PTZ cameras can be supplied with the latitude, longitude, and error ellipse for a given lightning stroke and can preferably automatically pan, tilt, and zoom to monitor the area within the error ellipse. This enables high-resolution instant monitoring. The use of the system for triggering fire cameras can be provided with two main features: (1) Lightning Data: preferably having lightning parameters including latitude and longitude of the strike point, error ellipse, and indication of intercloud (IC) vs. cloud-to-ground (CG) lightning; and (2) Pan-Tilt-Zoom (PTZ) cameras: The cameras preferably can be calibrated to a specific point, such as, without limitation, true north and they can preferably automatically zoom on the possible ignition area that corresponds to the area of the lightning error ellipse. The disclosed system and method allow for the cameras and drones to be efficiently triggered providing for better performance and utilization of the camera and/or drone systems, as compared to current use of such camera systems. The novel system and method can efficiently trigger wildfire camera systems, forest services, drones, etc.

The system and method can also be used to empower NGOs and land trusts to protect against illegal burning (i.e. those that are claimed to be lightning induced). The system also provides for real-time fire tracking, and can display a screen to allow a user to see fires that were detected by the AI of the system within the last 24 hours (though not limiting, and other time periods, greater and smaller, can be selected and are considered within the scope of the disclosure). In one non-limiting embodiment, the use can click on one of the displayed first locations (i.e. points on a map on a computer or electronic device screen) and see more details about the particular event.

As noted above, it is believed that less than 5% of the lightning strikes can ignite fires. These HRL strikes tend to have long continuing-current and large charge-transfer. Also disclosed herein, is an HRL detector/detection system component for the overall novel system and method that can have a dual-band design that allows it to provide precise current duration and charge transfer measurements. The novel detector/detection system can be provided with three-dimensional lightning imaging capabilities, which can lead to: (1) More precise lightning localization: The lower part of the lightning channel is often not completely vertical, which means that 2D mapping takes an average of the lower part of the lightning channel and reports that as the lightning strike location. 3D mapping provided by the disclosed novel detector/detection system allows for the precise imaging of the location where a lightning stroke attaches to the ground. Precise lightning location information (preferably down to 30 meters, though not limiting) can enable fire fighters and emergency managers to efficiently navigate their crews to the potential ignition spot, and to effectively utilize camera and drone systems for fire reconnaissance; and (2) Richer information about the cloud charge structure: 3D imaging can lead to relatively richer information about the cloud charge structure that can allow for a better understanding of the type and state of the thunderstorm, and it can enable the localization of the cloud charge pockets. This can be used for nowcasting and can also reinforce the charge transfer measurements that can be used for the fire ignition risk models.

DETAILED DESCRIPTION

Figure 1:
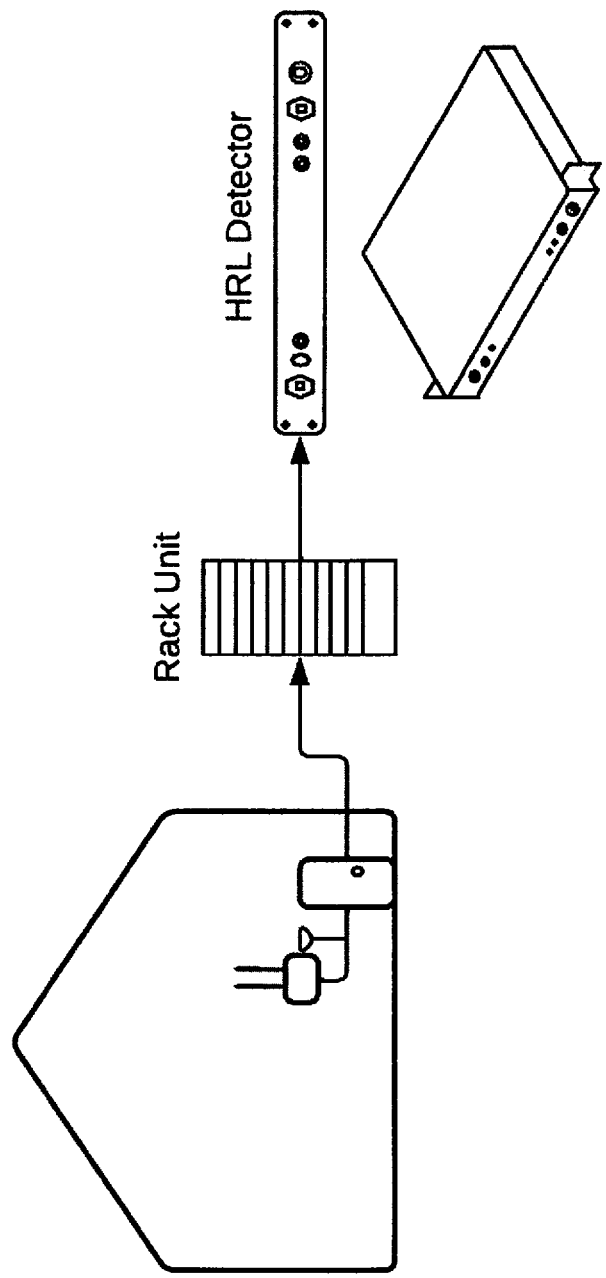
FIG. 1 illustrates a general schematic for the detector system component of the disclosed novel system and method for detecting high-risk lightning strikes in accordance with a non-limiting embodiment of the present disclosure.
Figure 2A:
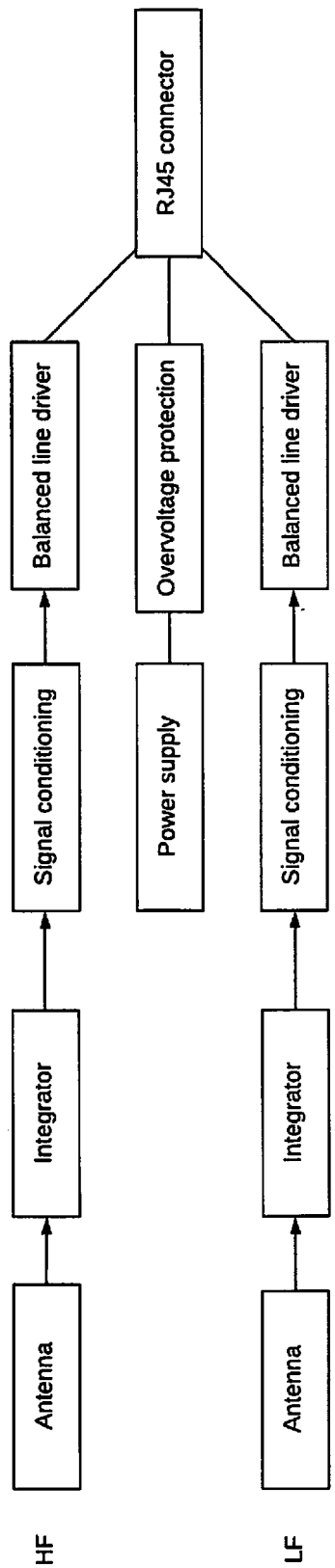
FIGS. 2A and 2B illustrate a detailed system architecture and networking chart for the detector system component in accordance with a non-limiting embodiment of the present disclosure.
Figure 2B:
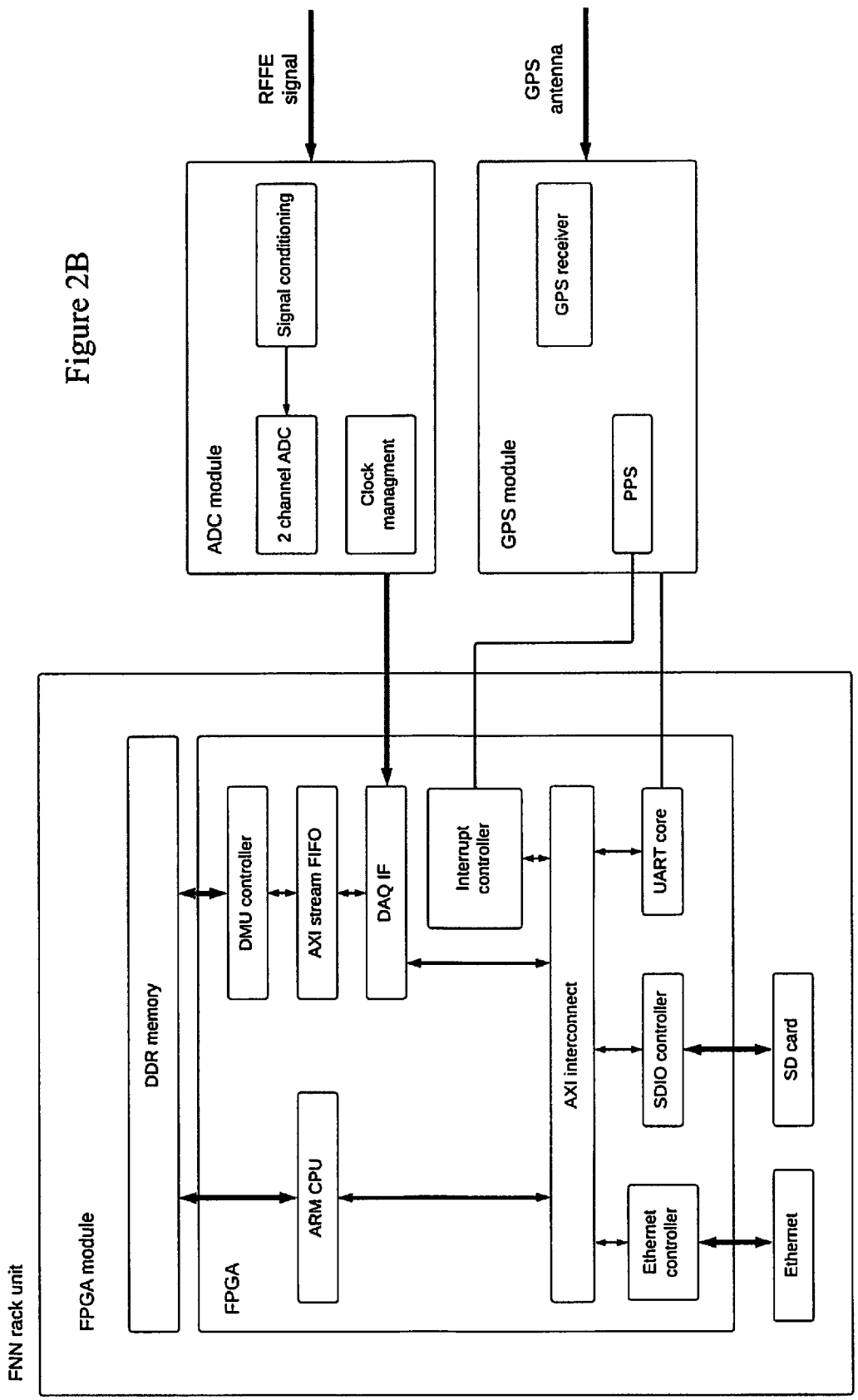
Figure 3:
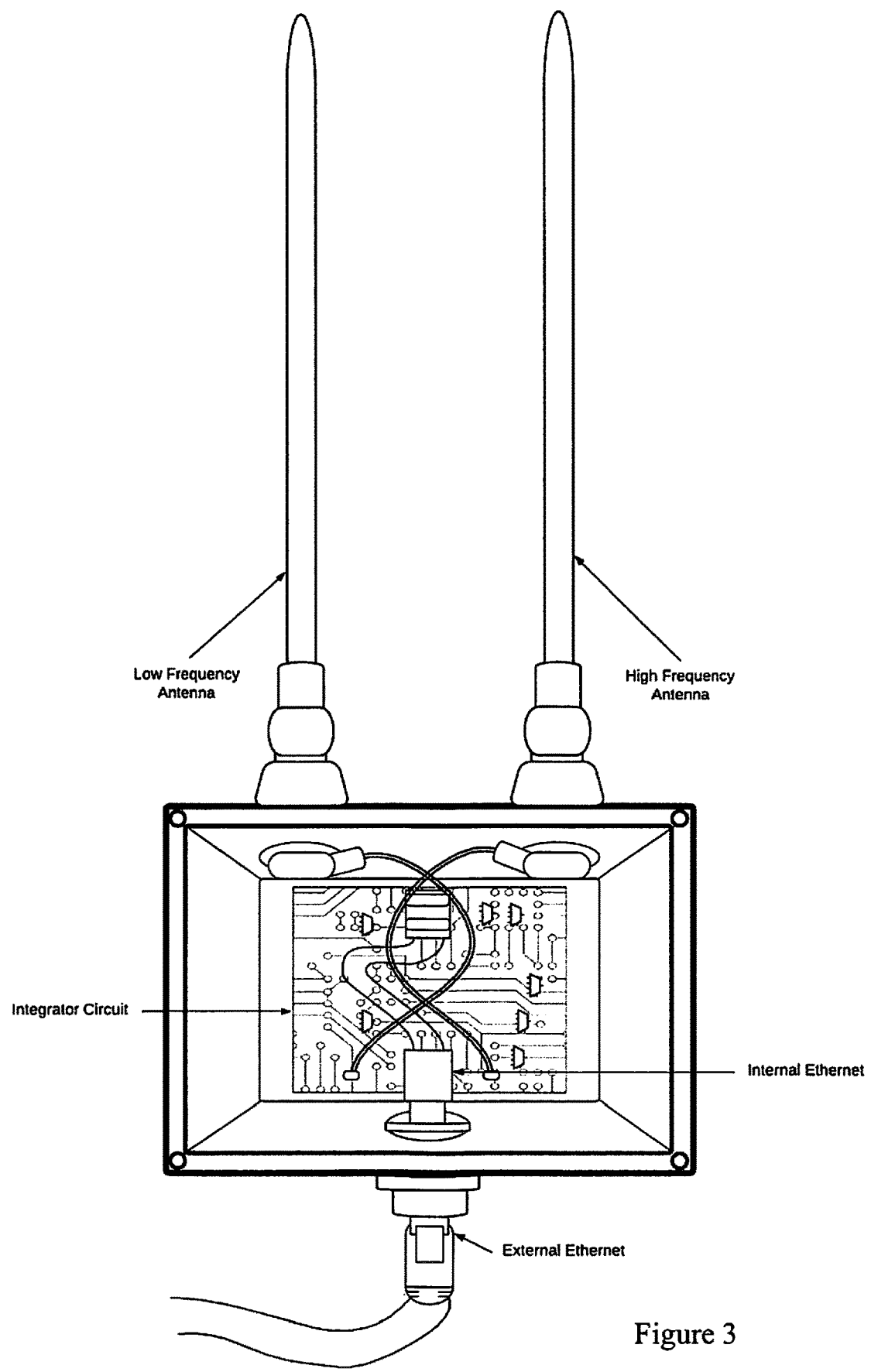
FIG. 3 illustrates a non-limiting embodiment of the antenna and the front-end system for the detector system component in accordance with the present disclosure.

As seen in FIG. 1, a general schematic for the detector system component for the overall novel system and method is shown. The high risk lightning ("HRL") detector can be preferably installed inside a building or other enclosed structure in a rack unit, while an antenna and front-end system can be preferably installed outside the building. A GPS antenna can also be provided. FIGS. 2A and 2B show a non-limiting embodiment of the preferred major components for the HRL detector system, including the detector hardware components and the front-end system. Though preferably the HRL detector can be installed within a rack unit inside a building/other structure, such is not considered, and the HRL detector can also be installed or positioned at other internal and/or external locations with respect to the building/structure and can be used in connection with the novel system and method without being installed in a rack unit. Preferably the HRL detector can be connected or otherwise in electrical/wireless communication with a router or similar device for transmitting electric field measurements to the cloud server for processing as discussed further below.

The HRL lightning detector hardware system can measure the electric field waveshapes emitted by lightning strikes. The emissions from DC to 1 MHz can be recorded and digitized using in the HRL detector system electronics preferably at a sampling rate of 6 Mega samples per second, though such sampling rate is not considered limiting and other higher and/or lower sampling rates can also be used and are considered within the scope of the disclosure. For purposes of the disclosure, this can be labeled or identified as the high-frequency (HF) channel. The HF channel can have a shorter decay time constant (e.g. 1 ms, etc.), so it can accurately detect short pulses along the lightning channel without reaching saturation. This means that the small pulses (preferably all of the small pulses) along the lightning channel can be imaged and used for creating an accurate 3D lightning map.

The detectors and associated electronics also out in the field (i.e. forest, jungle, etc.) can be powered by any conventional power source, including, without limitation, battery, rechargeable battery, solar, AC (where available), etc.

Though not considered limiting, the emissions from 20 HZ to 100 kHz can be preferably recorded and digitized in the HRL detector system electronics at a preferred sampling rate of 1 Mega samples per second (though not limiting and other higher and/or lower sampling rates can be used and are considered within the scope of the disclosure). For purposes of the disclosure, this can be labeled or identified as the low-frequency (LF) channel. The LF channel can have a longer decay time constant (e.g. 1 second, etc.), so it can accurately detect long-continuing-current (LCC) without the electric field decaying to zero. This means that the current duration and charge transfer can be calculated without the need for electric field reconstruction. In a preferred, non-limiting embodiment, the lower frequency response is determined by the time constant of the system and the upper frequency response is determined by the operational amplifier, and no filters are employed. It is also within the disclosure, that the lower frequency limit can be practically/virtually DC, and/or that the upper limit can be controlled by an integrator circuit (i.e. low-pass filter), the bandwidth of the operational amplifier used and/or the frequency response of the antenna.

The detector system also includes a front-end system (FIG. 2A) and antennas for receiving the emission signals from the lightning strike and conditioning such signals before forwarding the conditioned signals to the detector hardware system, preferably disposed within the rack unit (FIG. 2B). As seen in FIG. 2A the dual antennas HF and LF can be connected to the front-end integrator electronics that integrate the electric field derivative (dE/dt) signal into electric field (E) signals. Though not considered limiting, preferably monopole whip antennas can be preferably used, and the preferred, non-limiting range for an effective range for LCC lightning detection can be 30 km or about 30 km, though other higher and/or lower ranges can also be selected and are also considered within the scope of the disclosure. The integrator stage can be followed by analog signal conditioning and the single ended signal is transformed into a balanced signal so that the front-end can drive long (e.g. up to 50 meters, though not considered limiting and higher and/or lower values/dimensions can be used and considered within the scope of the disclosure) shielded twisted pair cables to the RJ45 ports on the HRL Detector. Preferably, all of the lightning parameters, needed for subsequent processing by the cloud servers/AWS cloud services, can be contained in the electric field signals. Any environmental data needed can be downloaded from central databases. Preferably, the dual antennas (HF and LF) can be connected to the front-end integrator electronics that integrate the electric field derivative (dE/dt) signal into electric field (E) signals.

Figure 4:
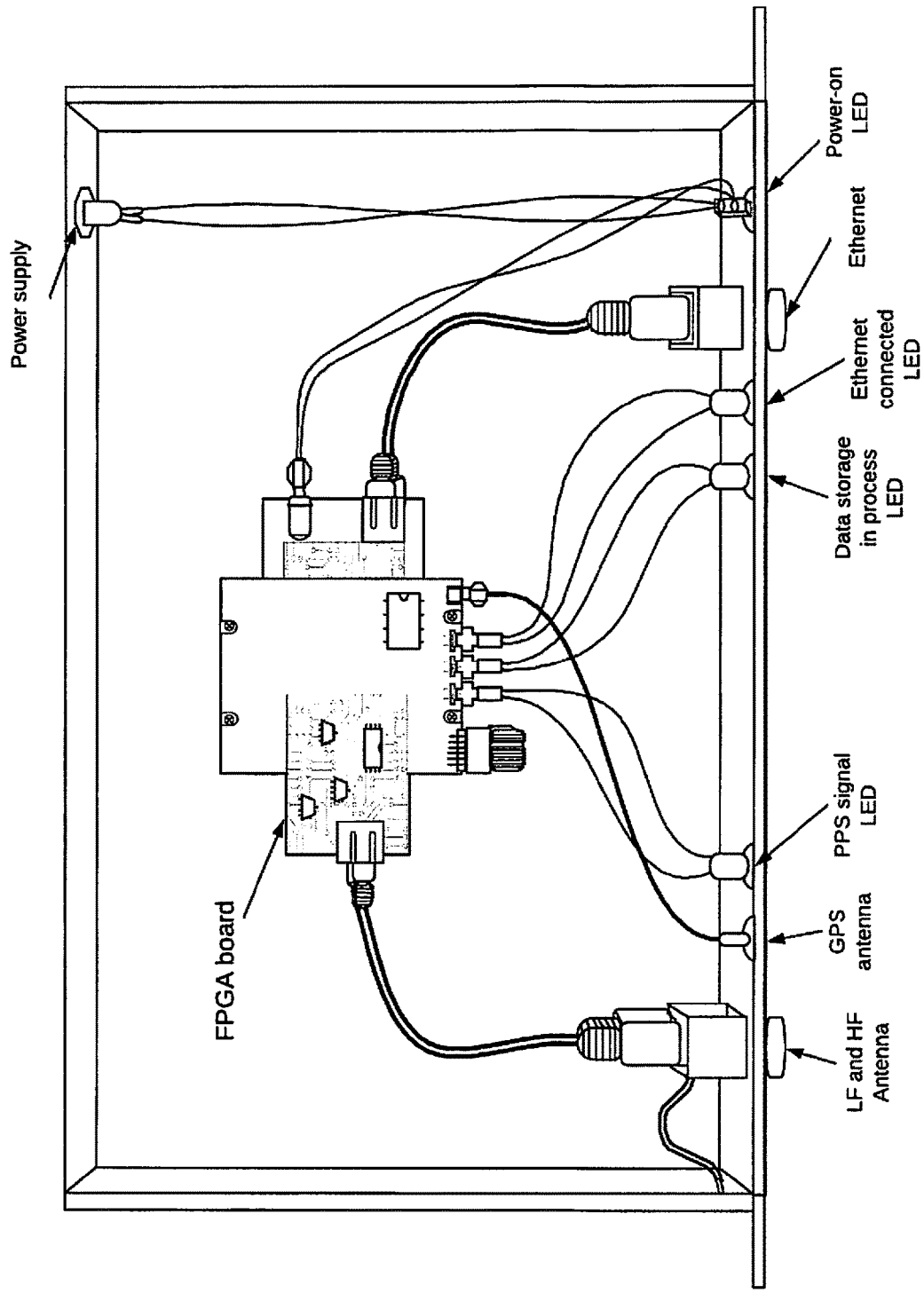
FIG. 4 illustrates a top view illustrating the internal components of a preferred, non-limiting HRL lightning detector in accordance with present disclosure.
Figure 5A:
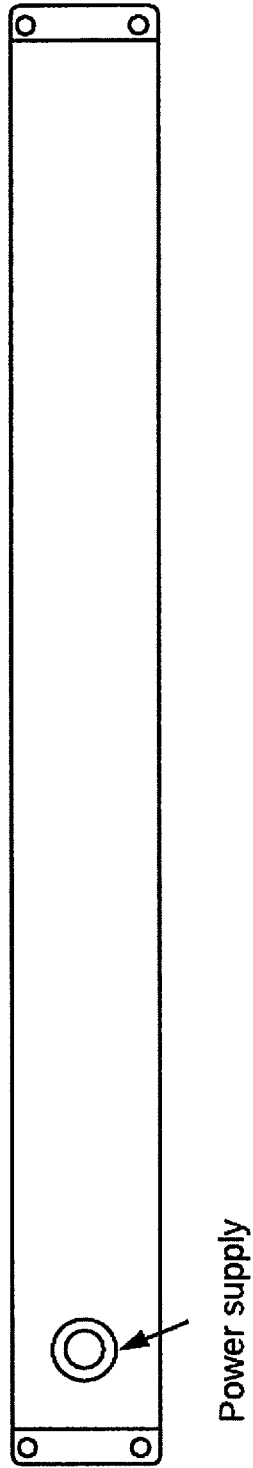
FIGS. 5A and 5B illustrate a back and front view, respectively, of the HRL lightning detector of FIG. 4.
Figure 5B:
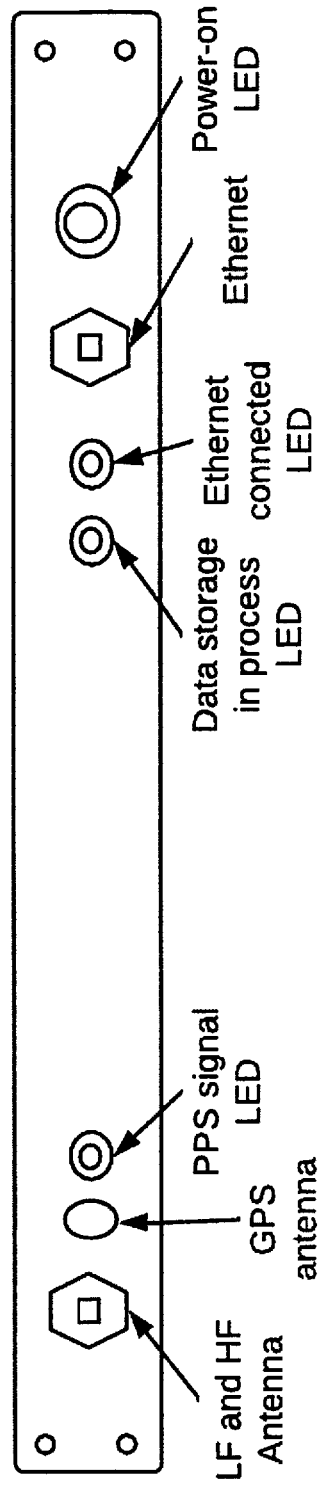

The next stage of the HRL detector can be a Field Programmable Gate Array (FPGA) based data acquisition unit that receives the analog signals of the Radio Frequency (RF) frontend on two channels (LF and HF). The two channels can be converted to digital signals by the analog-digital-converter (ADC), preferably as a non-limiting example at 10 bits at 1 MSPS (LF), and 1-10 MSPS (HF). The data can be continuously stored into an onboard circular buffer. Once an event occurs, the received waveform (+/−0.5 sec) can be stored in random access memory (RAM) and on an SD card. Preferably, the events can be timestamped using GPS time synchronization, or other timestamping technology. The events recorded at this site and any other different sites can all be collected and/or transmitted/sent to a central server (e.g. AWS server, etc.) where the lightning analytics can be carried out. FIGS. 4, 5A and 5B illustrates a non-limiting, preferred embodiment for the HRL detector used in the overall detector system.

Though not considered limiting, a high frequency range can be from 20 Hz or about 20 Hz to 2 MHz or about 2 MHz and a preferred high frequency range can be considered 40 Hz or about 40 HZ to 500 KHz or about 500 KHz. Though not considered limiting, a low frequency range can be from 0 Hz or about 0 Hz to 300 Hz or about 300 Hz and a preferred low frequency range can be considered 0 Hz or about 0 HZ to 100 Hz or about 100 Hz.

Figure 6:
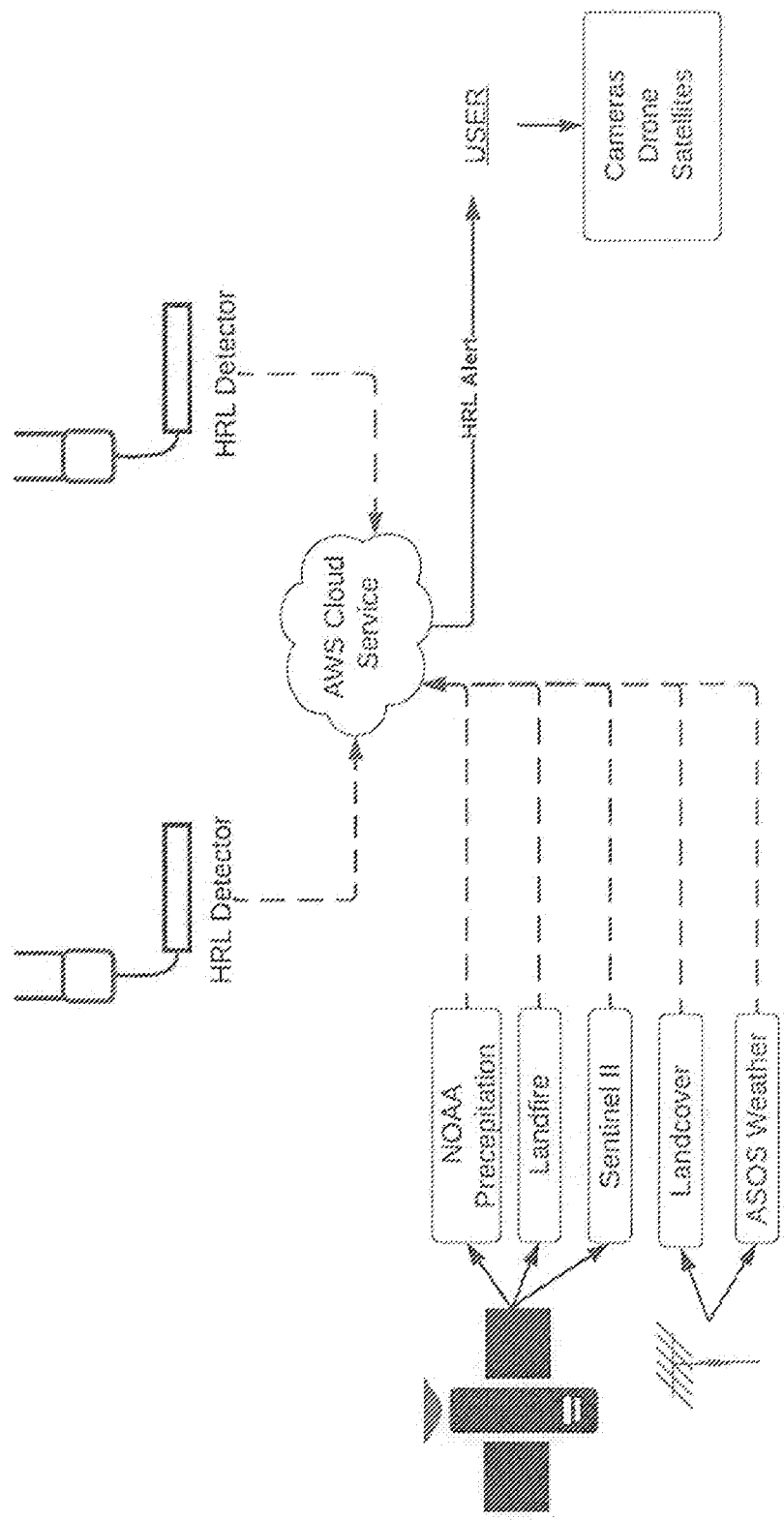
FIG. 6 illustrates a block flow diagram showing data being transferred from the HRL lightning detectors at the location of the lightning strike to a central, preferably remotely located, server where the data is processed in accordance with the present disclosure.

As seen in FIG. 6, the electric field waveshape data can be transferred from the relevant detectors for the particular lightning strike to a central, preferably remotely located server, such as without limitation AWS cloud service. Other cloud server services and/or other servers can also be used and are considered within the scope of the disclosure. The data storage and processing can be in the cloud server/central server where (1) the lightning parameters can be calculated, (2) the environmental data can be processed, (3) the AI for the system can select the High-Risk-Lightning (HRL) events, and (4) an HRL Alert can be issued. Preferably, both the storage and data processing used for determining an HRL event can be done on the cloud server/central server, which can act as an independent computer.

Preferably the novel system/network and method described herein can use a large set of inputs to train the AI, apply lightning science, and can use selection algorithms to find high-risk-lightning (HRL). Use of finding HRL events is a major improvement over traditional lightning detection as the disclosed novel system/network and method can deliver actionable intelligence by selecting those lightning strokes that present a high risk of ignition (i.e. start of wildfire) and assigning a risk profile to each HRL. The False Alarm Rate (FAR) and False Dismissal Rate (FDR) can be optimized to meet a specific user needs. As a non-limiting example, Florida Forest Service firefighters prefer to have the FDR close to 0%.

Figure 7:
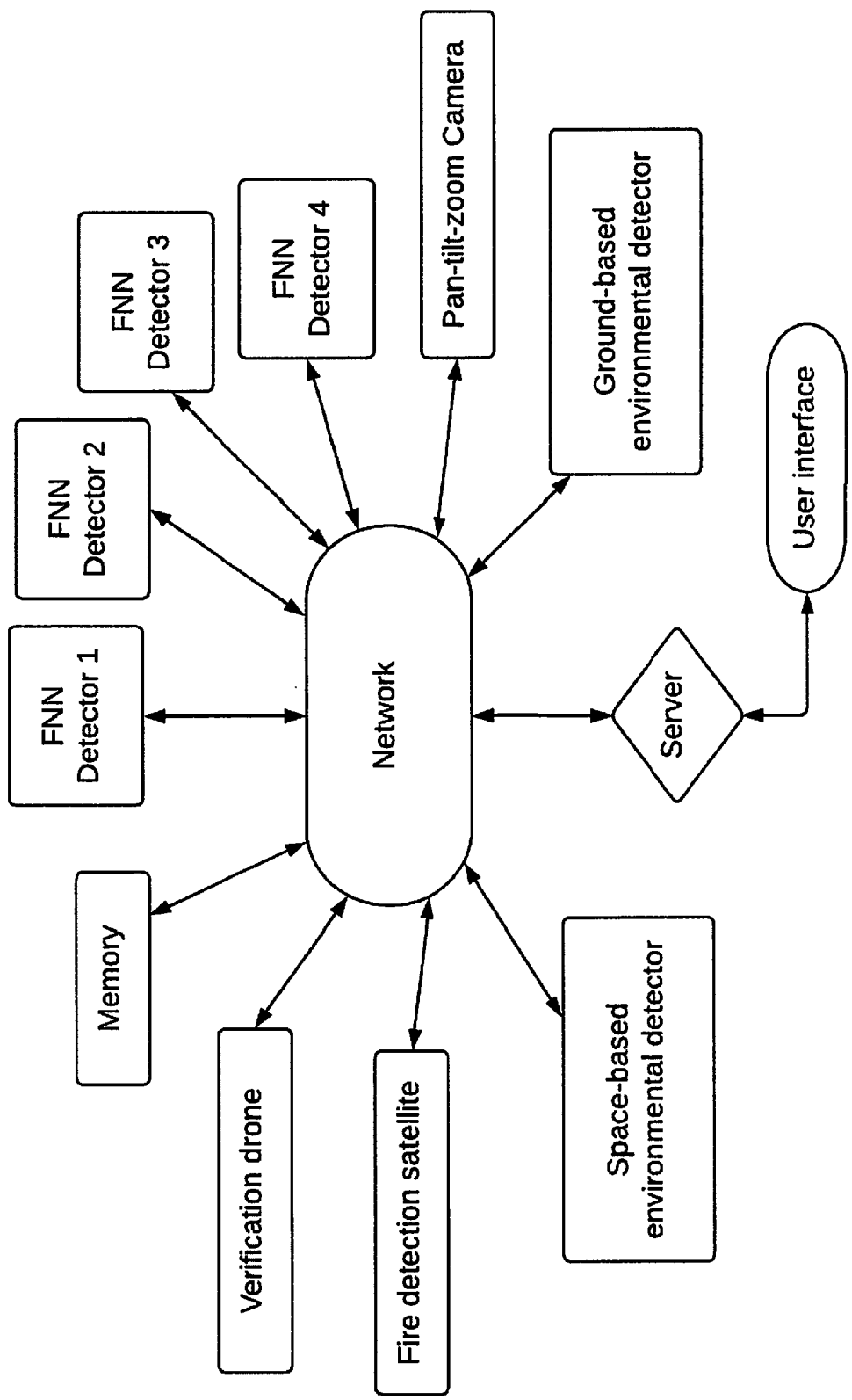
FIG. 7 illustrates one non-limiting embodiments for the various connection/communications (i.e. wireless and/or wired connections and/or communications) between the preferred systems components and other components that the novel system communicates with in accordance with the present disclosure.

FIG. 7 illustrates one non-limiting embodiment for the connections/communications between the HRL detector inputs, environmental data inputs, and fire verification systems (i.e. central server). Preferably, as the processing server is located remote to the detectors (which are located out in the field, forest, etc.) and the environmental data sources, preferably communication is made by wireless and/or satellite technology, though it is also within the scope of the disclosure to include wired communications/connections between at least some of the components and independent data sources.

Figure 8:
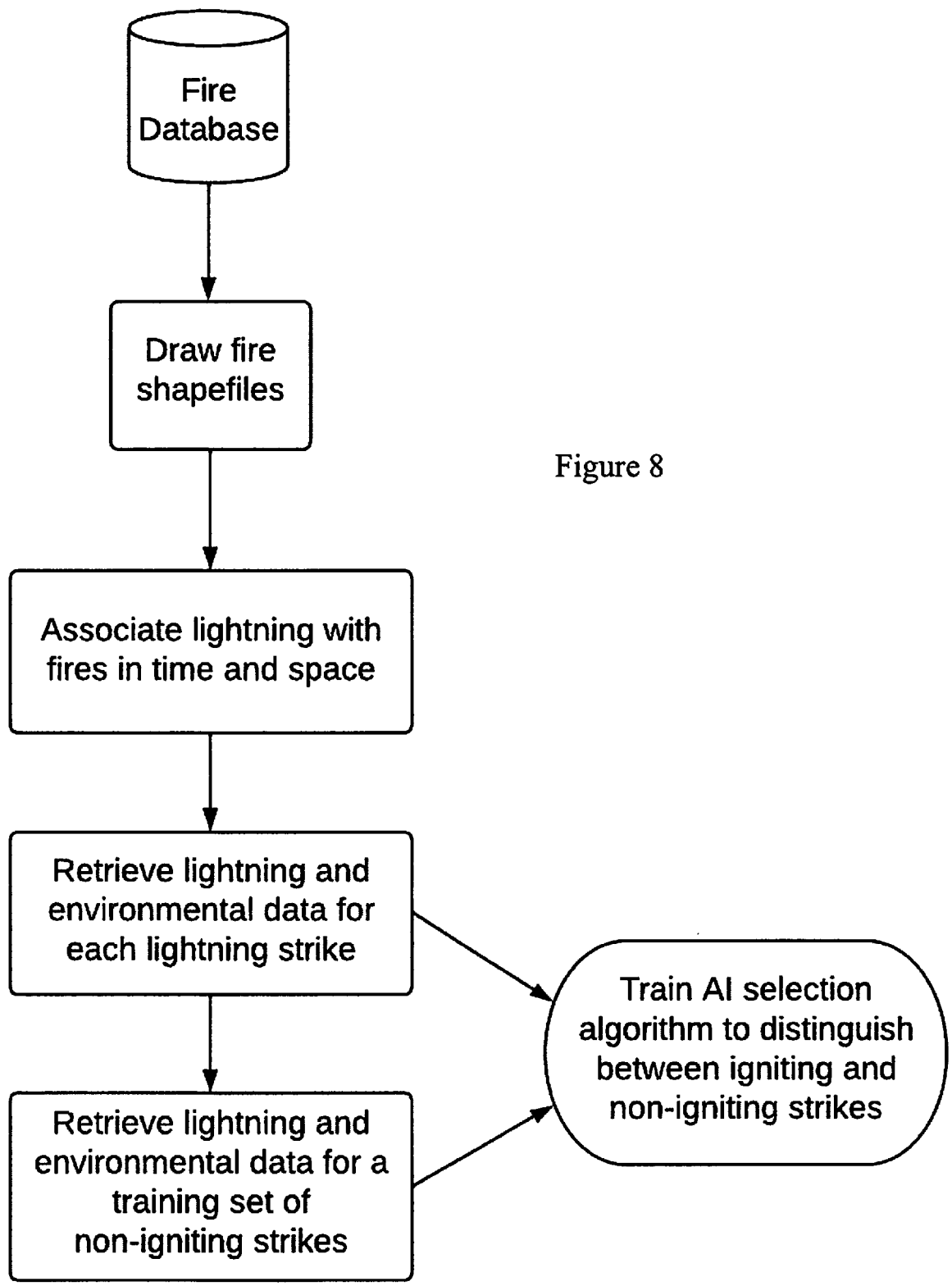
FIG. 8 illustrates a flowchart of non-limiting steps involved when training the AI of the novel disclosed system to distinguish between igniting and non-igniting lightning strikes in accordance with the present disclosure.

FIG. 8 illustrates the general steps performed for training (or otherwise improving) the Artificial Intelligence (AI)/HRL event selection computer program of the novel system (preferably running on the AWS cloud/central server. The AI/machine learning software/computer program can be trained to distinguish between igniting and non-igniting strikes and the novel disclosed neural network can be trained/improved to recognize what combination of lightning data and environmental data result in a High-Risk-Lightning (HRL) strike that will ignite a fire. Preferably, the selection algorithm can use a neural network that can be trained to distinguish between igniting and non-igniting strikes. The neural network can be trained to recognize what combination of lightning data and environmental data results in a High-Risk-Lightning (HRL) strike that will ignite a fire.

Non-limiting examples of lightning data that can be used as part of the AI training, as well as for use when determining a current HRL event, include:

1. Location information: Latitude, longitude, error ellipse showing location uncertainties.
2. Current information: Peak current amplitude, polarity, stroke multiplicity, current duration, charge transfer Non-limiting examples of Environmental Data used which can be downloaded from central databases associated with the central service or third party databases, such as, without limitation, governmental database. include:

1. Weather data: Temperature (e.g. 2 m), relative humidity (e.g. 2 m), wind, insolation, cloud cover. Optimally, at least or less than 500 m spatial and 1 hour temporal resolution. Ground-based data from stations such as ASOS, FAWN, RAWS, as well as satellite-based systems such as GOES-16 are employed. Accumulated precipitation (NOAA satellite products and radar products with 1 km spatial and 5 minute temporal resolution).
2. Vegetation and Fuel: Fuel condition data such as 1, 10, 100, 1000 hour fuel moistures, 1 to 20 day soil moisture, energy release component, ignition component, burning index, drought code, duff moisture code, fire weather index, KBDI, and spread component (with available time resolution). Data from Sentinel I and II (including all 12 bands and combinations such as NBR and NDVI). Landcover data and Landfire maps are used for detailed vegetation classification. As used herein, "fuel" is referring to items and materials that can be easily ignited such as, but not limited to, dry wood and grass.

Figure 9:
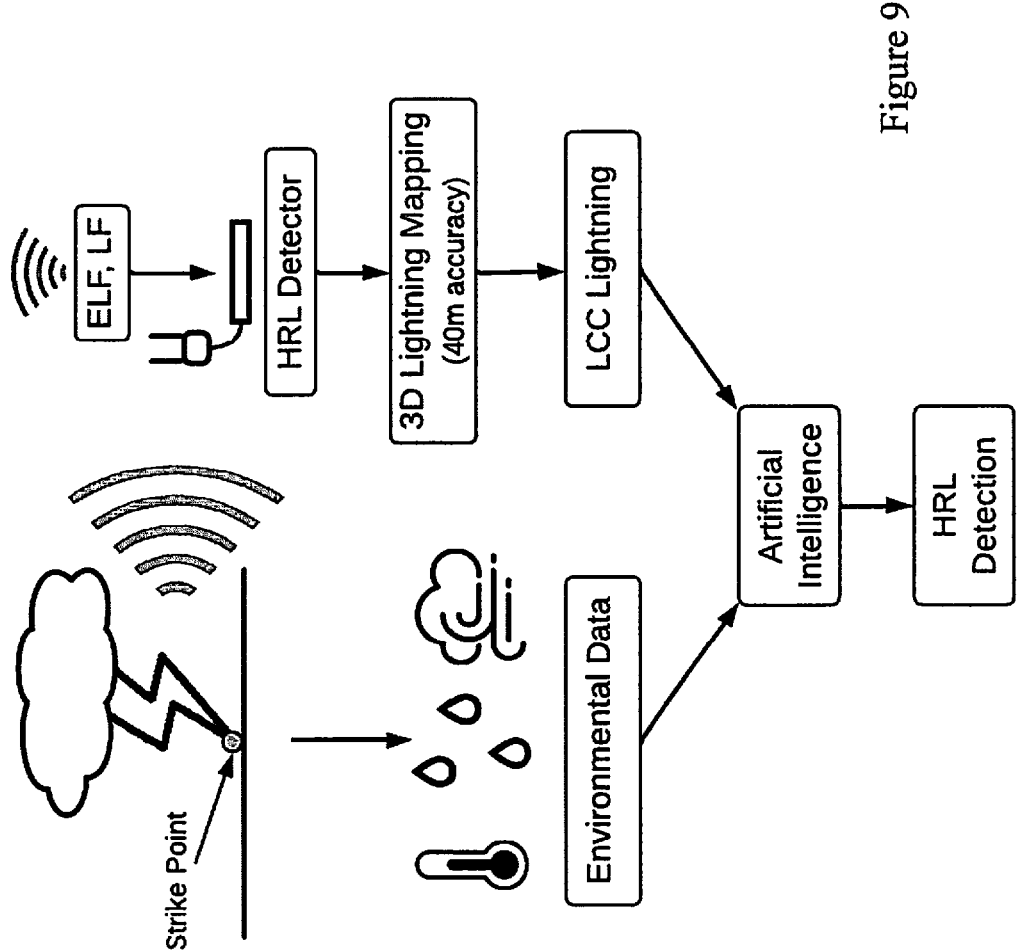
FIG. 9 illustrates a process flow block diagram showing the general steps involved for detecting an HRL event by the disclosed novel system and method in accordance with the present disclosure.

FIG. 9 illustrates the general steps for determining an HRL event by the disclosed novel system and method. As seen a lightning strike occurs and emits electric field waveshapes at the Low-Frequency (LF) and Extremely-Low-Frequency (ELF) bands. The novel HRL detector, preferably in connection with the antennas and the front-end system, detects the signals from the emitted electric field. 3D mapping can be achieved or otherwise performed using a time-of-arrival technique and the presence of Long-Continuing-Current (LCC) can be calculated using the electric field waveshape. Then, using satellites and/or ground sensors environmental data can be obtained for the strike location. The AI system provided as part of the central processing server (preferably remotely located from the location of the HRL detectors in the field) can analyze the lightning parameters and the environmental parameters to determine whether a High-Risk-Lightning has occurred and/or whether an alert needs to be issued, such as, without limitation, to firefighting personnel, etc.

Figure 10:
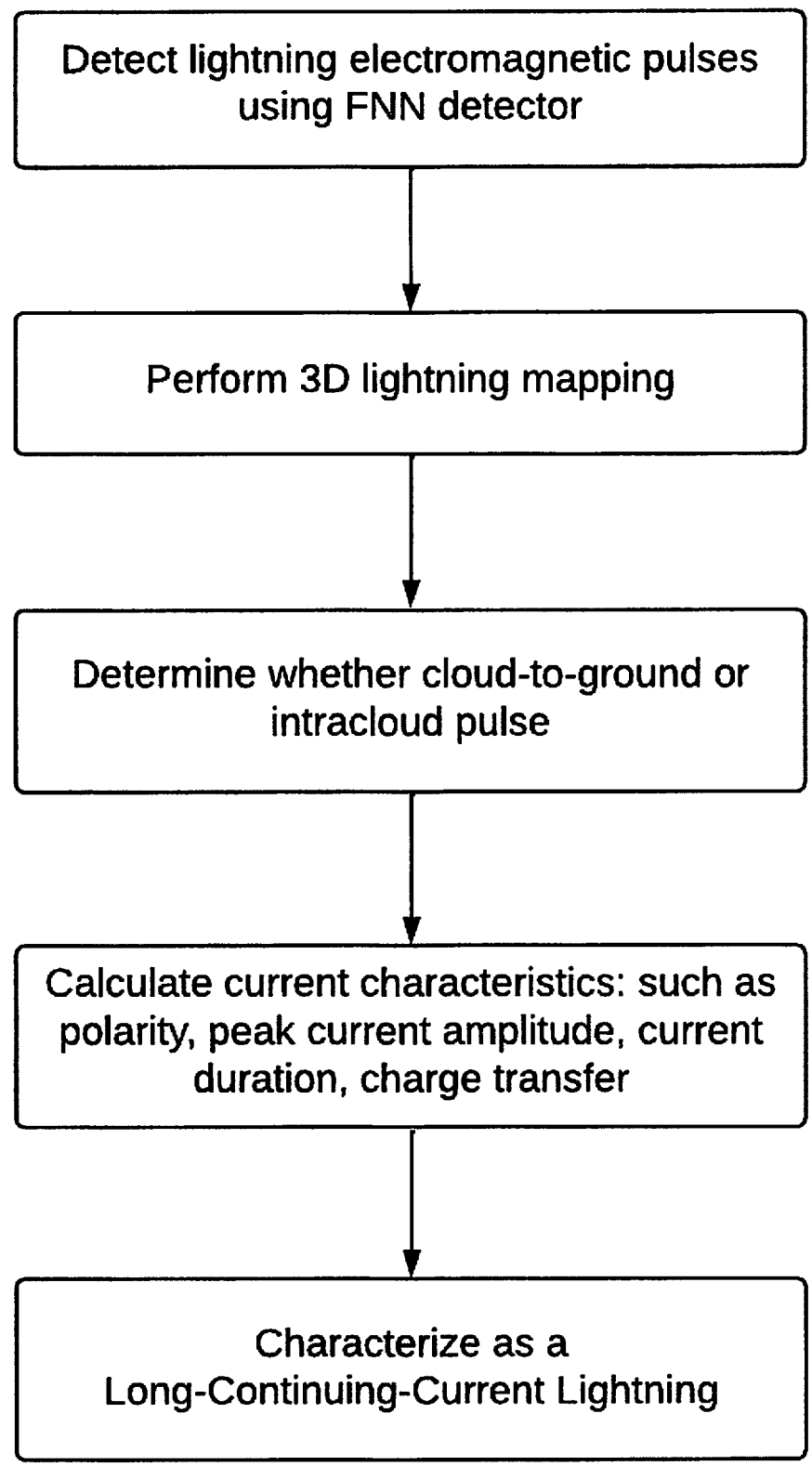
FIG. 10 illustrates a process flow diagram for lightning detection and characterization in accordance with the present disclosure.

FIG. 10 illustrates the general steps for lightning detection and characterization. The electromagnetic pulses from a lightning strike are detected by one or more HRL detector systems in the geographical area of the location of the lightning strike. 3D lightning mapping is then performed. The system also detects whether the lightning strike was a cloud-to-ground (i.e. relevant for potentially igniting a fire/wildfire) or an intracloud pulse (i.e. not relevant—as the lightning strike does not reach ground). The system then calculates current characteristics, such as, without limitation, polarity, peak current amplitude, current duration, and/or charge transfer. Based on the results of calculating the current characteristics, the lightning strike can be determined to be a LCC lightning strike and thus the type possibly to ignite a fire/wildfire. Though not limiting, the system can be designed such that current characteristics are only calculate where a cloud-to-ground lightning strike has been determined to have occurred.

The 3D lightning mapping, determinations concerning cloud-to-ground or intracloud pulse and/or current characteristics calculations are preferably all performed by the central server (i.e. the detector records, timestamps, and submits the electric field waveshape to the central server for processing), though it is also within the scope of the disclosure that, for example to save on internet bandwidth in remote locations, or one or more of the steps/functions can be performed by the detection system (i.e. be included in the detection system/HRL detectors electronics, FPGA, circuitry and/or software) and be included when the detection system forwards the information it received regarding the lightning strike to the central server. Thus, preferably the detector records the electric field waveshape. timestamps it and sends it to the central database. However, this can be a lot of data, so in remote locations the FPGA can be programed to calculate lightning parameters (e.g. time of field peaks, electric field peak of return stroke) locally.

Figure 11:
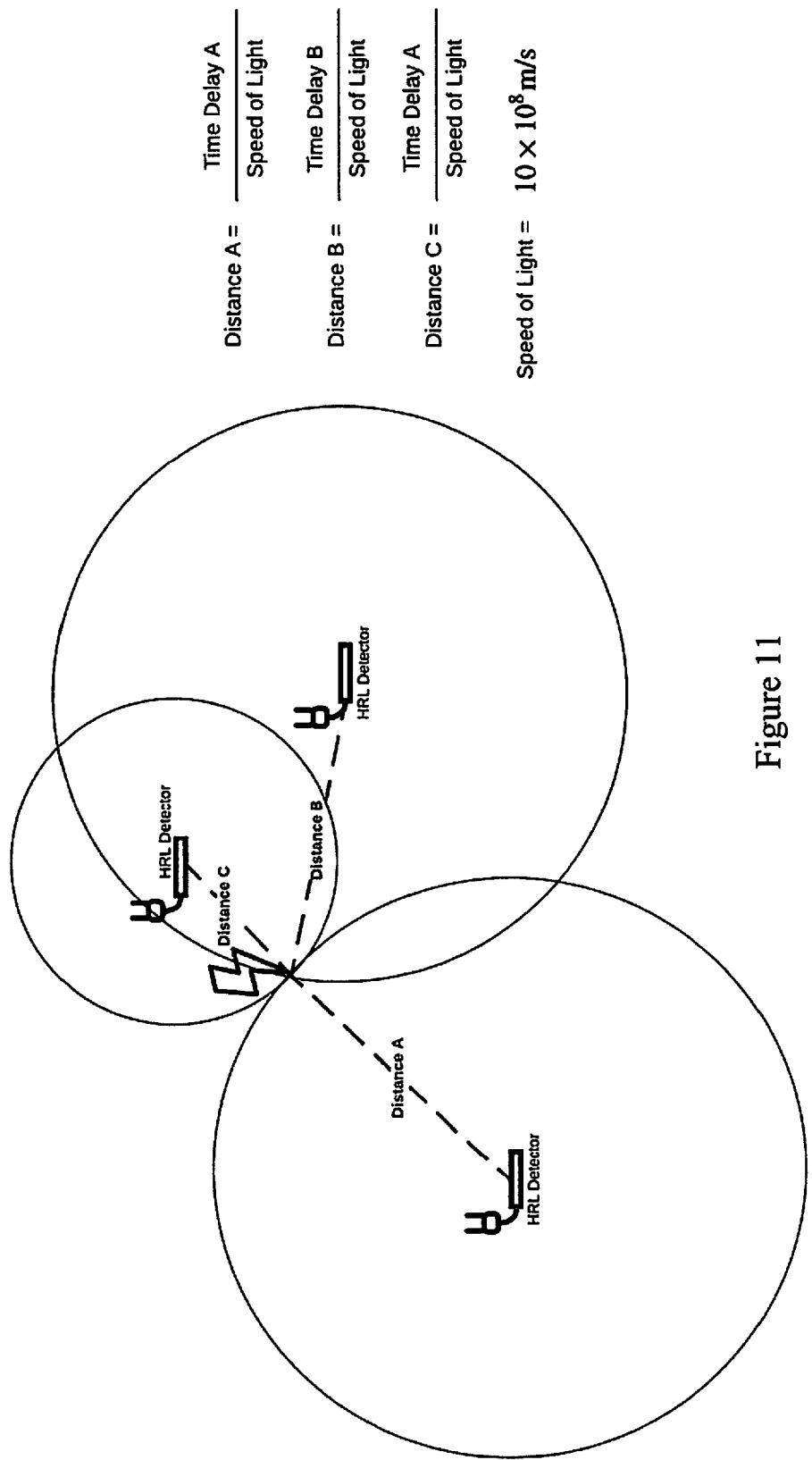
FIG. 11 illustrates electric field wave shapes and the point of where they overlap being the location of the lightning strike.

FIG. 11 illustrates the electric field waveshapes reaching the HRL detectors in the field (i.e. woods, forest, etc.) at different times based on the distance between the lightning strike and the location of the detectors. Using this timing information, the system can run a time-of-arrival algorithm in the cloud to calculate the position of the lightning strike. The electric field waveshape can also be used to calculate the other lightning parameters that can be provided to the system as part of information used by the central server/AWS server for determining whether an HRL event. Then, using satellites and ground sensors, environmental data can also be obtained for the determined strike location. The AI system, as part of the central processing system, can analyze the lightning parameters and the environmental parameters to determine whether a High-Risk-Lightning alert needs to be issued. When determining the distances, the speed of light is $3 \times 10^8$ m/s.

As illustrated in FIG. 11, the time-of-arrival (TOA) technique can be used to calculate the position of the lightning strike using timing information. While the figure illustrates a 2D example for visualization purposes, the same approach can be used to map lighting in 3D. In the 3D case the circles are replaced by spheres, the radii of the circles are replaced by the radii of the spheres (calculated using the same time-delay/speed-of-light formula), and the intersection of the spheres represents the emission point of the detected radiation. As the leader propagates towards the ground it emits radiation at distinct points, and by reconstructing the 3D location of these emission points the system can accurately draw out the 3D shape of the lightning channel. The novel system and method described herein is uniquely capable of carrying out accurate 3D mapping using the TOA technique because of the following features of the system: (1) it has a sensitivity to frequencies consistent with lightning leader pulses, (2) it has a short baseline (preferably less than 30 km, though not limiting) that allows for clear detection of ground waves even from leader processes, and (3) a data processing unit that sends the entire lossless electric field waveshape to the cloud server for processing.

Figure 13:
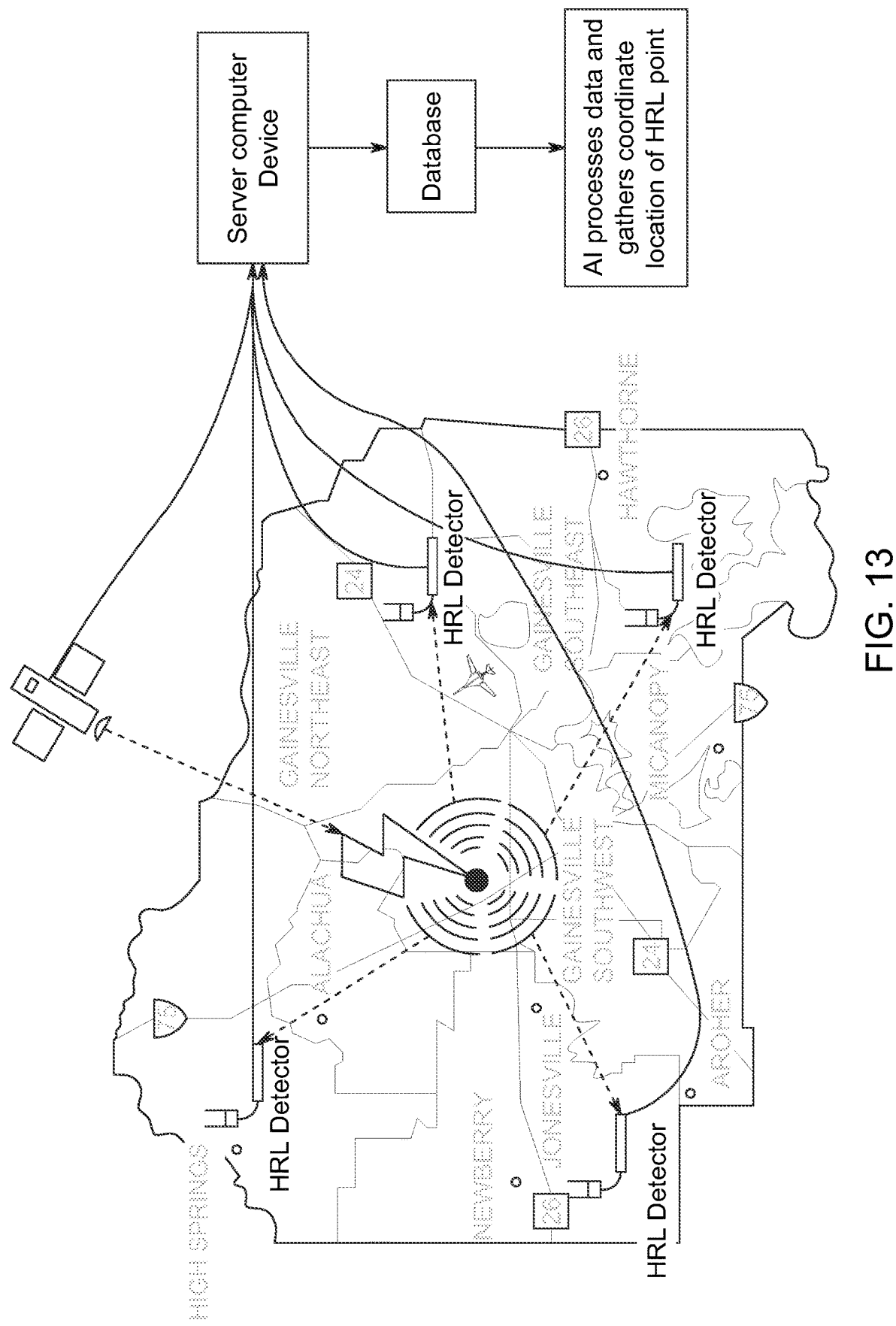
FIG. 13 illustrates electric fields emitted by lightning events being detected by the HRL detectors located out in the field in accordance with the present disclosure.
Figure 14:
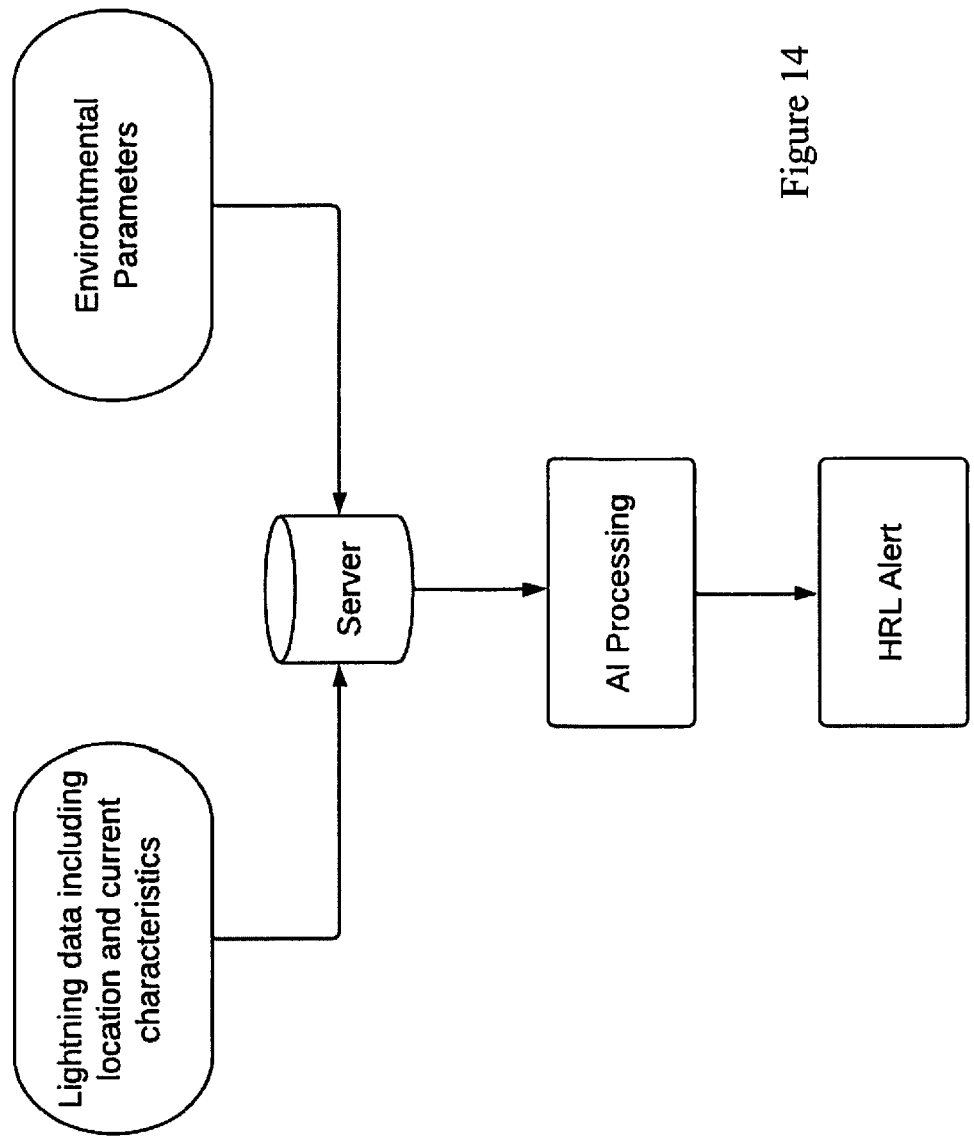
FIG. 14 illustrates a general process flow block diagram for the novel system and method in accordance with the present disclosure.

FIG. 13 shows a non-limiting example of electric fields emitted by lightning events being detected by the HRL detectors on the ground (4 pictured, as a non-limiting example). This data can be preferably combined with satellite and ground-based environmental data in the central server, where the AI algorithm of the system/services calculates the lightning locations and selects HRL events.

Figure 12:
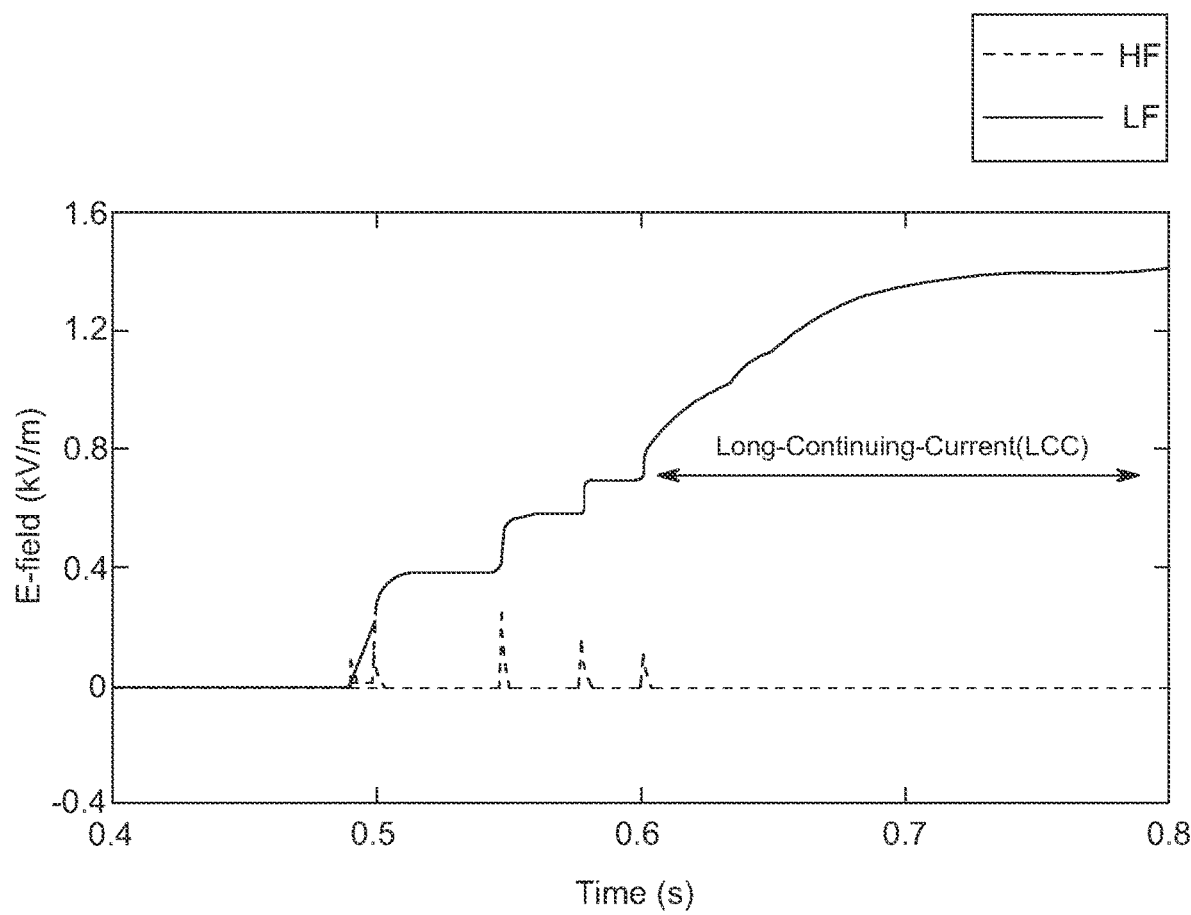
FIG. 12 illustrates a lightning electric field waveshapes graph for use in accordance with the present disclosure.

FIG. 12 illustrates a non-limiting example of a lightning electric field waveshapes graph for use with or by the disclosed novel system and method. HF is shown as basically the horizontal line at the "0" vertical axis with the pulses, while the LF is shown as the non-linear line extending upwards. The HF channel allows for the detection of pulses along the lightning channel and the timing of these pulses can be used to reconstruct the lightning channel in 3D. The LF channel has a lower gain to avoid saturation, making it less sensitive to small pulses, however the long time constant associated with the LF channel allows for the detection of long-continuing-current (LCC) by the novel system and method.

The HF channel captures information about each electromagnetic pulse emitted by the lightning leader. The HF antenna preferably can have a short (1 ms, etc.) decay time constant, so the HF channel can also be called or considered the fast channel. For this reason, preferably all of the pulses in the HF channel can have a fast decay (i.e. they are short, well-defined pulses see in FIG. 12) which enables the accurate timing (40 nanosecond GPS timing accuracy or similar time period) of each small lightning leader pulse, not just the main pulses emitted by the return stroke. This means that each pulse can be triangulated and an accurate (40 m resolution) 3D lightning map can be created. When the same lightning event is detected by two or more lightning detectors the system is able to connect the events using the interpulse intervals, which serves as the unique identifier for each lightning strike. In FIG. 12, it is seen that the electric field pulses of the HF can be clearly defined and when there are a dozen or so pulses then the timing between two consecutive pulses is unique for each lightning strike (e.g. 2 ms, 4 ms, 8 ms, 1 ms, 13 ms).

The LF channel is not ideal for location information, because low frequencies are not ideal for measuring short pulses. Rather, it is better or preferred to measure slower lightning processes in the LF range. For this reason, the LF antenna is often also called or considered the slow antenna. Relatively slow processes (lasting 10s to 100s of ms) are best captured by the LF antenna, as the LF antenna has a long (1 second, etc.) decay time constant, which allows the system and method (including the AI/Machine Learning algorithm) to accurately detect long-continuing-current processes without having to compensate for instrumental decay.

In case the LF channel is not available, a novel deconvolutional method can be used to transform the HF signal and obtain electric field waveshapes that can resemble the LF signal. When the time constants are much smaller than the time variations in the signal under consideration, the output of the antenna system can follow the temporal behavior of electric field derivative, which can be referred to as the HF measurement. Usually, HF measurement systems have times constants smaller than a few milliseconds.

Figure 18:
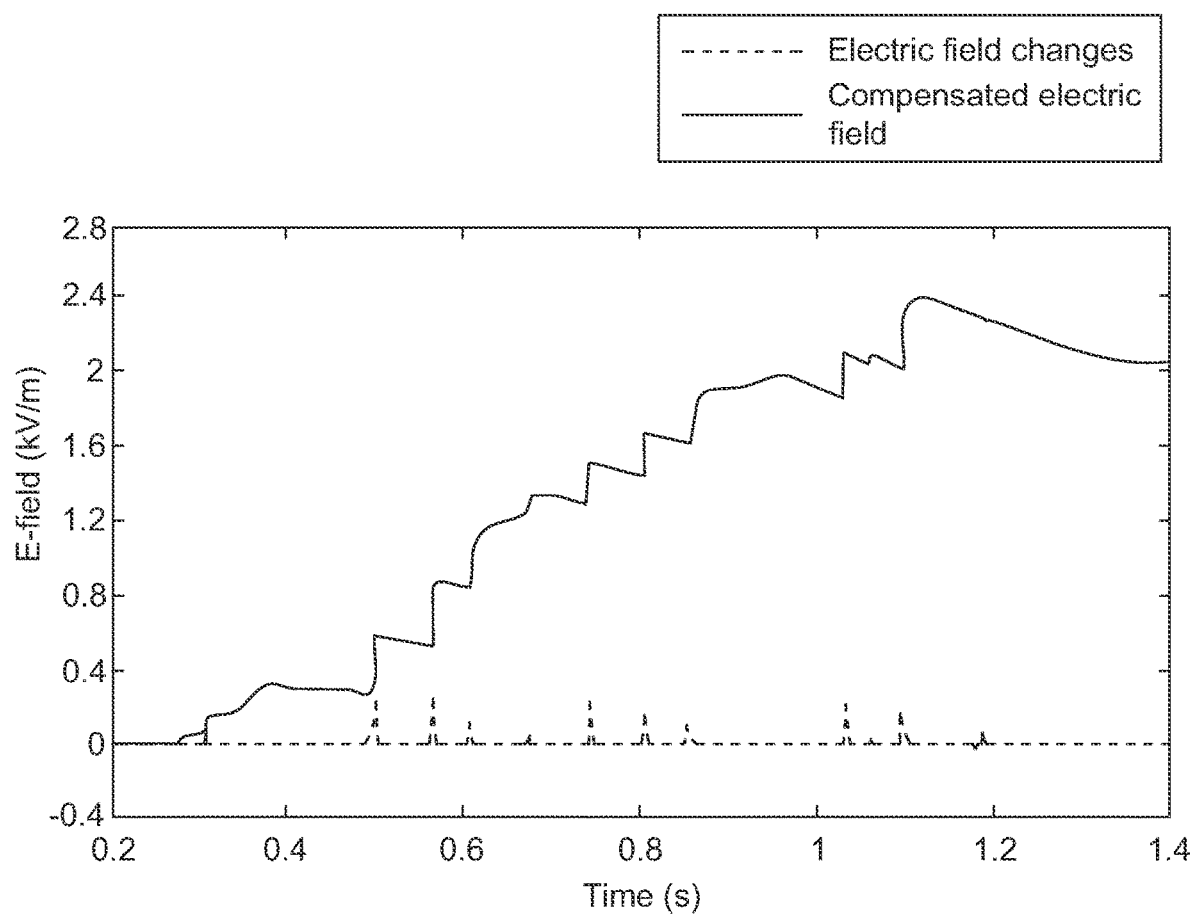
FIG. 18 illustrates a compensated electric field waveform of a measurement obtained by an HF system in accordance with the present disclosure.

FIG. 18. shows (labeled: Electric Field Changes) a typical, non-limiting, profile of electric field changes of a negative downward lightning flash obtained with an HF measurement system similar to the embodiment illustrated in FIGS. 2A and 2B, though other embodiments can be used and are considered within the scope of the disclosure. Note that pulses indicate fast electric field changes associated with return strokes currents. After the last pulse, a small offset component can be seen, due to the continuous current of downward lightning. Using deconvolution, the compensated electric field records can be obtained (Compensated Electric Field in FIG. 18.). Note that the compensated electric field records resemble the LF records shown in FIG. 12. For this reason, when the preferred LF records are not available, the deconvolution method presented herein may be used to obtain compensated electric field records (similar to LF) in order to calculate LCC duration and charge transfer.

Figure 19:
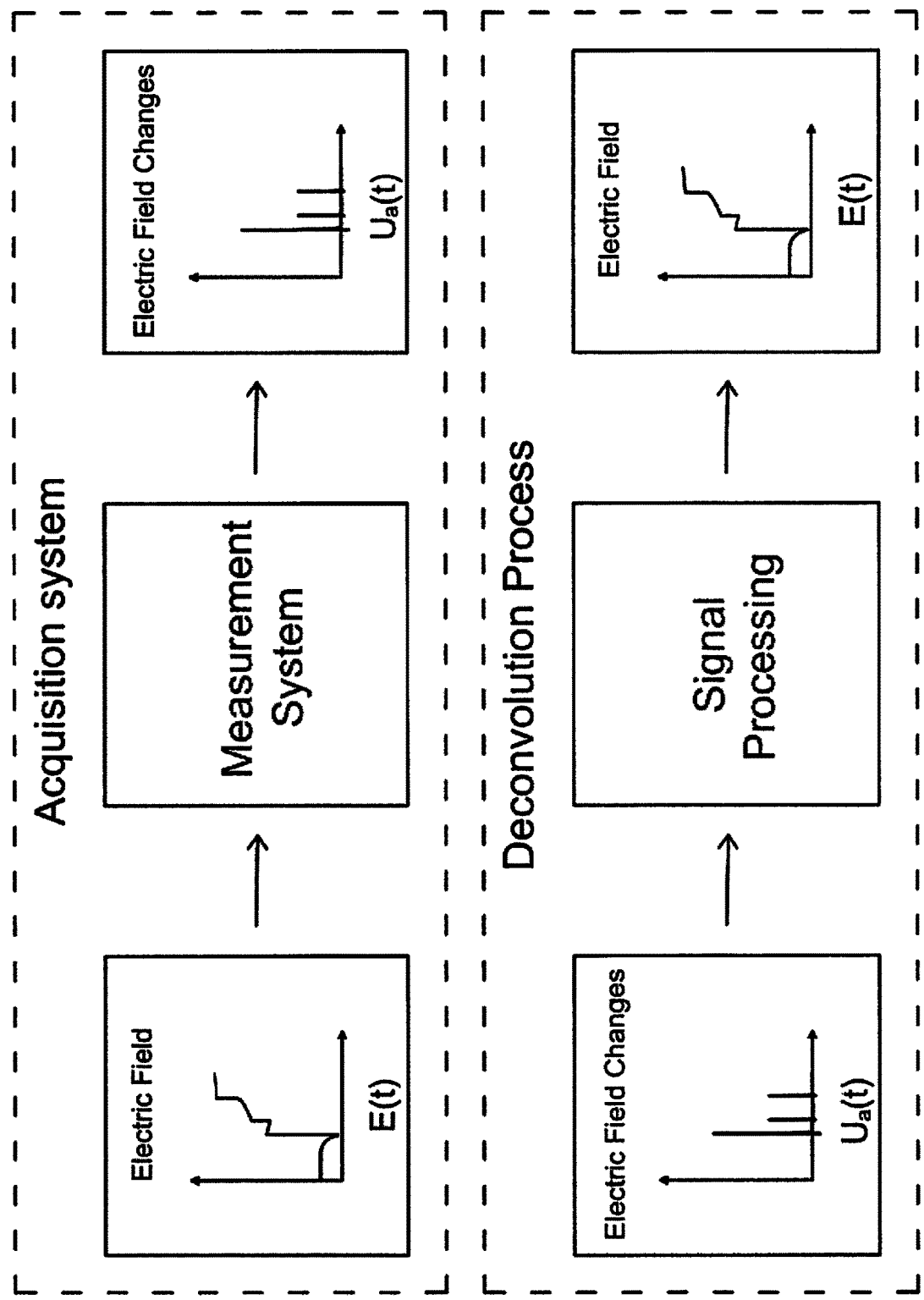
FIG. 19 illustrates a block diagram of an acquisition system and deconvolution process in accordance with the present disclosure.

Thus, the actual electric field profile (LF) can be obtained from the data recorded by the acquisition system (HF). Such procedure can be defined as a deconvolution process. FIG. 19 shows an overview of the acquisition system and the deconvolution process.

The signal processing procedure shown in FIG. 19 can be composed of several steps. First, the transfer function of the measuring system can be analytically obtained in Laplace Domain, considering all the features of the integrator circuit, The continuous-time transfer function of the measurement system is shown in (1). The voltage waveform obtained in the analog-digital-converter (ADC shown in FIG. 2B) is named as $U_\alpha$, which is proportional to the ambient vertical electric field (E) changes The parameters $C_{C_x}$ represent constants of a continuous-time system.

$$H(s) = \frac{U_a(s)}{E(s)} = \frac{C_{C_1} s}{C_{C_2} s^2 + C_{C_3} s + C_{C_4}} \quad (1)$$

Afterwards, the continuous-time dynamic system can be converted to a discrete-time system by means of a function available on MATLAB®. As input it can use the sampling rate of the digitizer, which can be 6 MSps for all data measured by the HF system. Therefore, applying the c2d function of MATLAB®, the discrete-time transfer function and its discrete-time constants $C_{d_x}$ can be obtained, which are shown in (2).

$$H(z) = \frac{U_a(z)}{E(z)} = \frac{C_{d_1} z + C_{d_2}}{C_{d_3} z^2 + C_{d_4} z + C_{d_5}} \quad (2)$$

The Z-transform equation shown in (2) can be validated by means of a test, which can be performed by using the step function available in MATLAB®. It's expected that both the continuous-time and the discrete-time transfer functions reproduce the same result when a step function is applied, since they represent the same system. Once the transfer function has been evaluated, the system can be described by difference equations, as shown in (3).

$$E_{[n-1]} = \frac{-C_{d_2} E_{[n-2]} + C_{d_4} U_{a[n-1]} + C_{d_5} U_{a[n-2]} + C_{d_3} U_{a[n]}}{C_{d_1}} \quad (3)$$

The compensated electric field can be obtained by applying the expression (3) considering the measured $U_\alpha$.

The disclosed system and method also provide for a novel process for triggering fire cameras and drones for confirming HRL lightning events and/or whether fire ignition has occurred at the determined spot of the lightning strike. The system and method trigger the drones and cameras based on detected lightning strikes, and preferably HRL detected lightning strikes. Real-time lightning data can be preferably used as triggers for one or more Pan-Tilt-Zoom (PTZ) cameras (though other cameras can be used and are considered within the scope of the disclosure) and/or drones and allows for the camera systems and drones to be efficiently triggered for superior performance over prior usage of cameras and drones for similar settings. The PTZ cameras and drones can be supplied with the latitude, longitude, and error ellipse for a given lightning stroke and the cameras and/or drones use the information to automatically pan, tilt, and zoom to monitor the area within the error ellipse. This enables high-resolution instant monitoring.

The disclosed novel system and method allows for drone efficiency to be maximized and drone operation costs to be minimized as the system/method allows the drones that are triggered to be sent to a specific location (latitude, longitude, error ellipse) to verify and/or extinguish a fire. The system and method can also ease regulatory concerns, as the drones can be programmed to only collect data at the specific lightning strike locations.

The system can comprise of two, non-limiting, main components:
1, Lightning Data: lightning parameters including latitude and longitude of the strike point, error ellipse, and indication of intercloud (IC) vs. cloud-to-ground (CG) lightning; and
2, Pan-Tilt-Zoom (PTZ) cameras and/or drones: The cameras preferably can be calibrated to true north (or any other selection point) and the cameras can preferably automatically zoom in on the possible ignition area that corresponds to the area of the lightning error ellipse. The drones preferably containing georeferencing capabilities (e.g. GPS) and they can preferably automatically go, or can be manually guided, to the possible ignition area that corresponds to the area of the lightning error ellipse.

Figure 15:
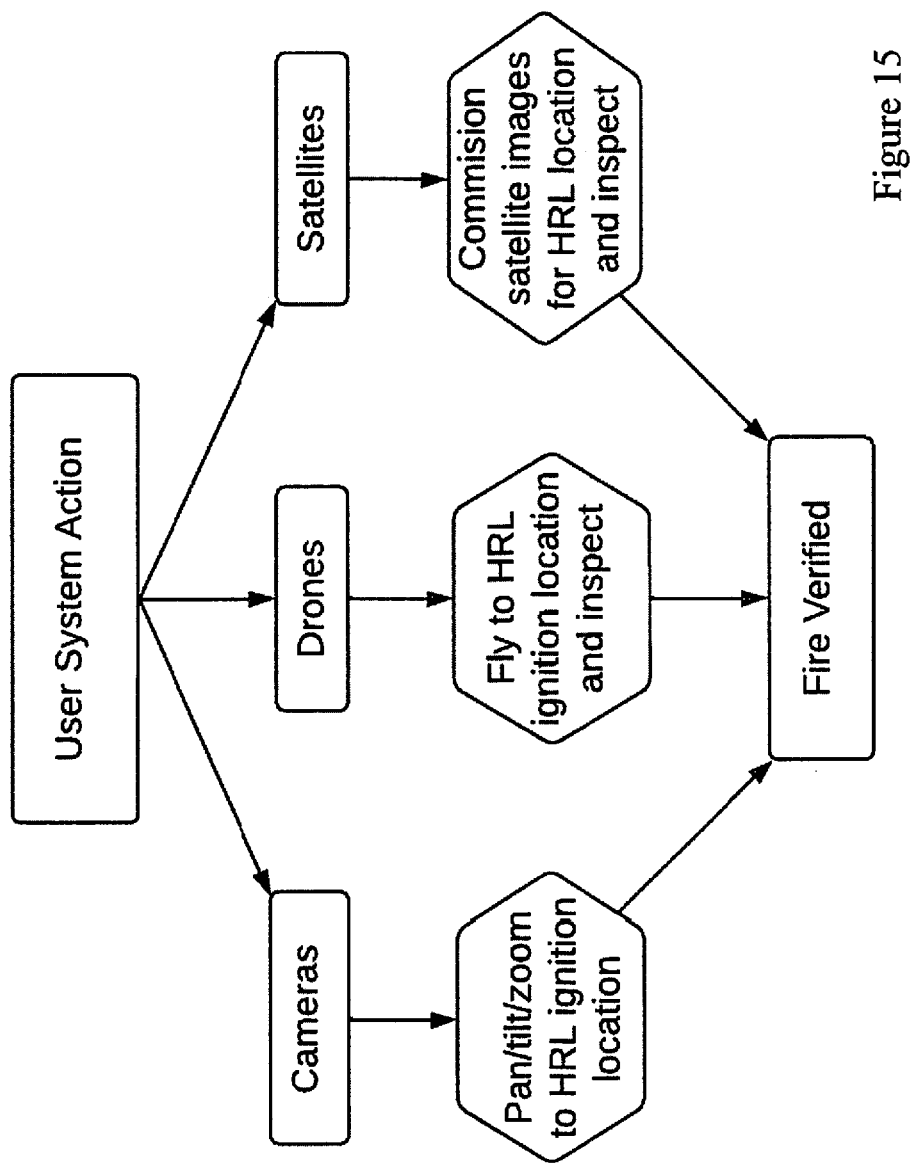
FIG. 15 illustrates a block diagram novel system and method for verifying a detected HRL event or actual fire ignition using cameras, drones and/or satellites in accordance with the present disclosure.

Thus, preferably, as seen in FIG. 15, once a High-Risk-Lightning (HRL) event is detected and/or an alert is issued for the HRL event the user preferably verifies or otherwise monitors the ignition location using (1) Pan-Tilt-Zoom cameras, (2) Drone inspection, (3) satellite detection. Non-limiting steps that can be employed include:

1. The HRL strike point coordinates can be fed (manually or automatically by the server) into the camera/drone system.
   a. One or more existing Pan-tilt-zoom (PTZ) fire cameras can be panned, tilted, and (or) zoomed onto the HRL point coordinates to verify fire ignition; and/or
   b. Drone(s) preferably equipped with proper visible spectrum and/or infrared/other camera(s) flies out autonomously (or can be flown out by a drone pilot) to the HRL point coordinates to verify fire ignition.
1. Fire ignition status at the HRL lightning strike point (and preferably the surroundings thereto) can be checked and reported back to the HRL system.
   a. The PTZ fire camera(s) can either continue to monitor the area in case a fire is detected at the HRL point or can comes back to the HRL point later (in case the fire is smoldering and not yet visible on the camera or as a further safety check if no fire or smoldering was originally detected at the strike point). The return period to the HRL point coordinates can be set by the lightning, fuel, and weather conditions.
   b. Drone(s) can either continue to monitor the HRL point if a fire ignition is detected, or can come back to the HRL point later (in case the fire is smoldering and not yet visible on the camera or as a further safety check if no fire or smoldering was originally detected at the strike point). The return period to the HRL point coordinates can be set by the lightning, fuel, and weather conditions.

2. Fire ignition status can be fed into the HRL algorithm to allow the preferred Artificial Intelligence based system to learn about the exact conditions at the point of the fire ignition or of a non-ignition.

Figure 16:
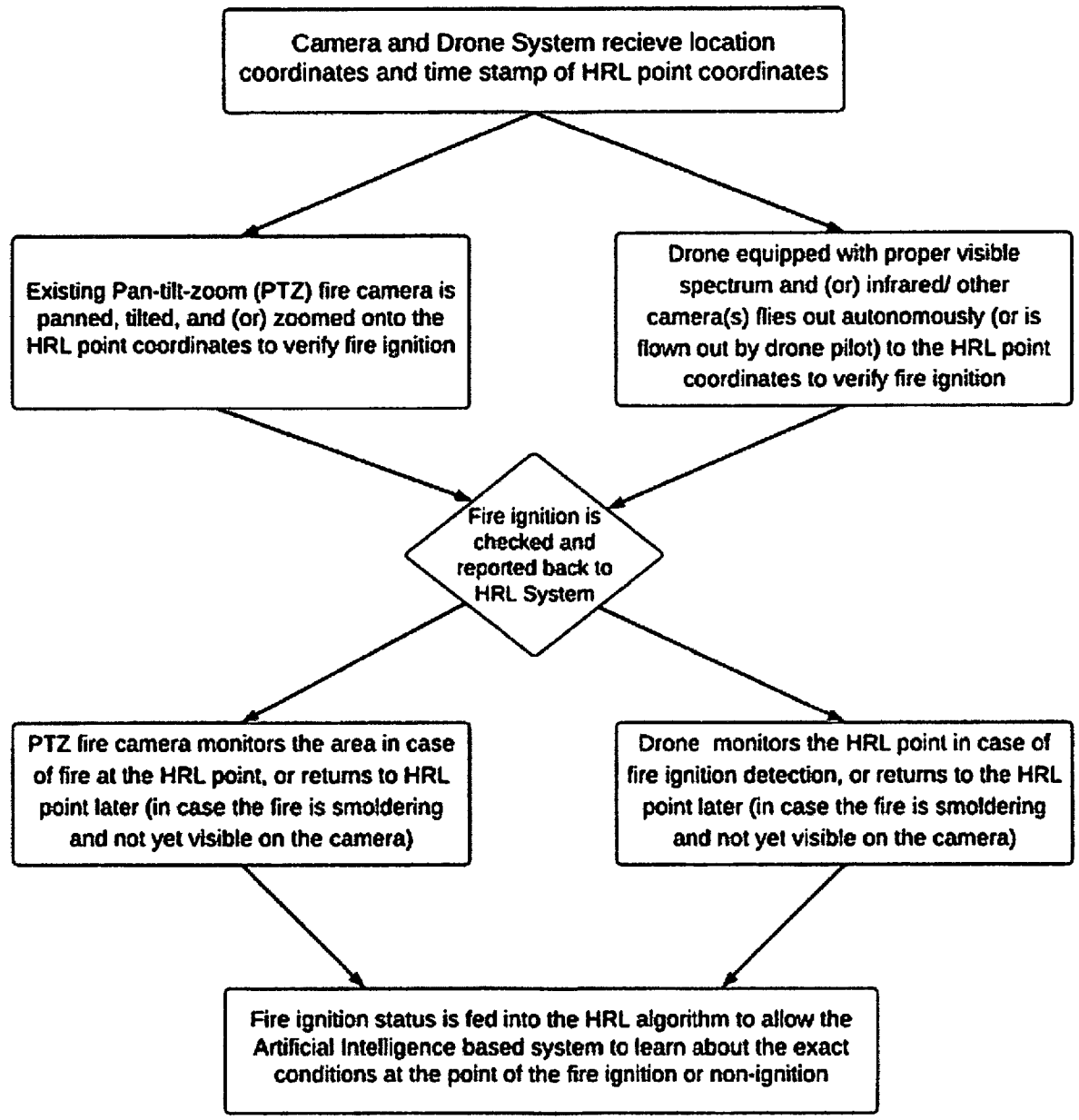
FIG. 16 illustrates a flow chart of the preferred non-limiting steps performed for verifying and/or monitoring for a fire or smoldering at an area detected to have experienced a HRL event in accordance with the present disclosure.

FIG. 16 illustrates the main steps performed in the verification process using camera(s), drone(s) and satellite(s). Preferably, once a High-Risk-Lightning (HRL) event is detected or an alert is issued the user preferably verifies the ignition location using (1) Pan-Tilt-Zoom cameras, (2) Drone inspection, and/or (3) Satellite detection to preferably determine if there is a fire ignition and/or smoldering at the location of the HRL event.

Satellite-based verification can also be used, preferably in addition to the cameras and/or drones, though, it is also within the scope of the disclosure to perform satellite-based verification without verifying with cameras and/or drones.

Lightning data can be incorporated into analysis performed by the AI/system and such data can be obtained through extracting useful information from satellite-based and earth-based observations. This satellite data can be used to validate the High-Risk-Lightning ignitions. Thus, one detection algorithm of the disclosed detection system and method can use satellite-based observations. As a baseline application, this algorithm can use high-resolution (preferably less than 500 m resolution), regular (preferably about or less than every 12 hours) infrared observations of the covered area. The algorithm can incorporate multiple infrared and optical bands along with weather or environmental information to further improve its sensitivity. The algorithm can than search for anomalous patterns in the satellite data that shows excess infrared radiation compared to what would be expected based on long-term trends and the radiation of the surrounding area. These anomalies can then be identified if they reach a predefined level of certainty. A machine learning-based method can be employed to optimize the algorithm and set its threshold to identify fires with high confidence when comparing the novel system's results to fires reported from other source, such as, but not limited to fires reported by CalFire in California over the year 2020, as well as other years and other fire reporting sources. The relevant steps of the algorithm are described and visually illustrated in FIGS. 17A and 17B.

The fires identified by the algorithm were considered in the validation of the high-risk-lightning detection algorithm. Preferably, a lightning strike can be considered to be truly high-risk if it temporally and spatially coincided with a fire. For spatial coincidence, allowance can be made for a 2 km difference between the fire's identified location and the lightning strike's identified location given the uncertainties in both of these localizations. For temporal coincidence, allowance for 3 days of time difference between a lightning strike and the identified start of the fire can be made, requiring that the lightning struck prior to the identified start of the fire. This time difference can account for possible delays in identifying a fire after its ignition, and the possibility that the spread of a fire is delayed following ignition due to environmental factors (e.g. a lightning strike can ignite a tree, but the fire only spreads beyond the tree once the surrounding vegetation dries sufficiently).

Figure 17A:
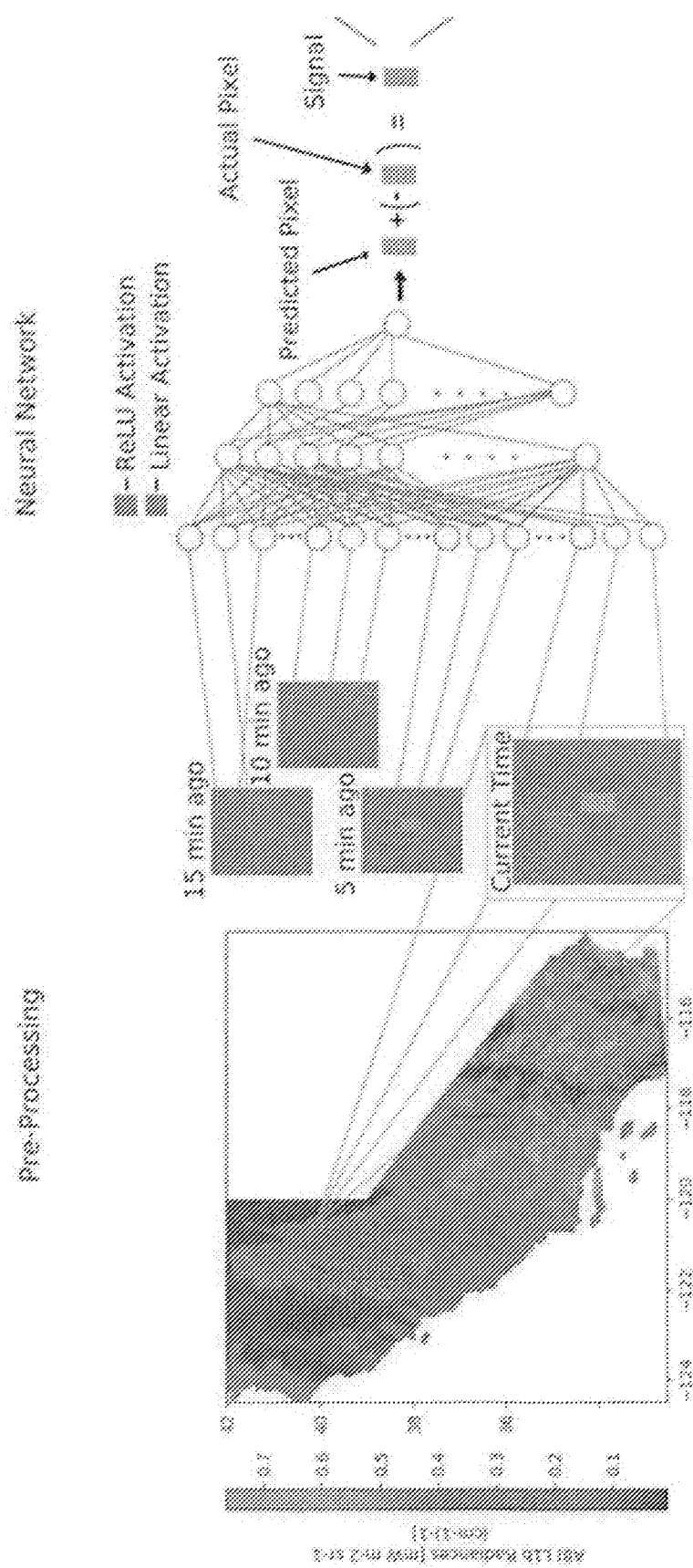
FIGS. 17A and 17B collectively visually illustrate the steps used or performed by the detection algorithm when analyzing satellite imagery of an HRL event area in accordance with the present disclosure.
Figure 17B:
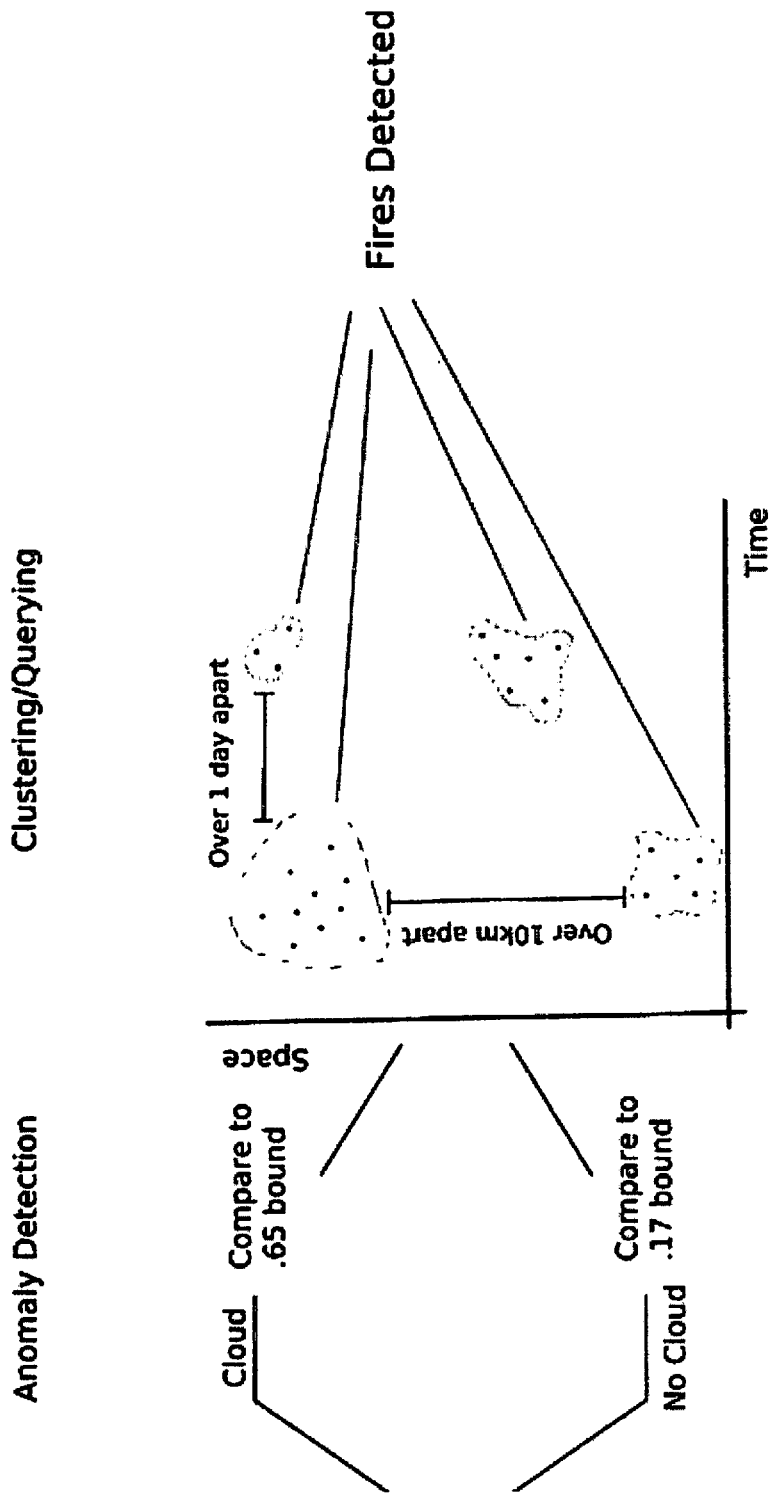

As seen in FIGS. 17A and 17B, the four main steps of fire detection algorithm can include, without limitation: (1) pre-processing, i.e. selecting surrounding pixels for input into the neural network regressor. (2) the neural network can predict the expected value of individual pixels based on the surrounding pixels and/or past behavior. (3) this prediction can be subtracted from an actual value of the pixel to quantify the level of anomaly, i.e. difference between expected and actual pixel value. Depending on if the region is under cloud cover or not it is compared to different threshold levels above which the anomaly is considered significant. (4) Anomalous pixels can be clustered by location and time as one fire can produce a series of pixels with anomalies.

To evaluate the high-risk-lightning identification algorithm of the disclosed novel system, false alarm probability and false dismissal probability can be used. The false alarm probability is the probability that a high-risk-lightning alert created by the algorithm does not correspond to an actual high-risk-lightning event. The false dismissal probability is the probability that a real high-risk-lightning event is missed by the algorithm which does not generate any corresponding alert. To estimate the false alarm probability and false dismissal probability, a known list of correctly classified fires can be first considered. For this purpose, and as a non-limiting example/source, the officially reported fires in California listed in CalFire's database can be used and the first were checked in NASA's FIRMS. The following procedure was then carried out:

a. Determined fraction $f_0$ of CalFire fires also detected by the system's algorithm. The system's false dismissal probability was considered to be $$\text{False Dismissal Probability} = 1 - f_0. \quad (1)$$

While the CalFire database does not contain all fires, it contains many major fires relevant to fire suppression efforts, and FIRMS was used, as a non-limiting example/source, to check for a more inclusive set of fires.

b. Determined fraction $f_{0,l}$ of these co-detected fires that are temporally and spatially coincident with a lightning identified by the system's satellite-based method. It was estimated and confirmed that a chance coincidence within the localization precision of up to several kilometers and temporal precision of 2 days gave negligible false coincidence rates, therefore such an association appears to provide for the indication of a causal connection.

c. As a consistency check, it was expected that $f_{0,l}$ be the same as the fraction of CalFire fires coincident with a lightning strike, which was confirmed.

d. The full list of fires detected by our algorithm were used and determined the fraction $f_l$ of them that were spatially and temporally coincident with lightning strikes. It was assumed that the fraction of fires that were caused by lightning in the CalFire sample was the same as the fraction of fires detected by the system in our sample. This can be further refined by accounting for the effect of lightning-ignited fires that had a higher fraction of the major than the minor wildfires. For simplicity this effect in this description was ignored. Then, it was considered that the CalFire sample contained no false alarm and the disclosed system to have a false alarm probability FAP.

$$f_{0,l} = f_l(1 - FAP).$$

Therefore:

$$\text{False Alarm Probability} = 1 - \frac{f_{0,l}}{f_l} \quad (2)$$

The above false dismissal and false alarm probabilities are preferably not fixed quantities. Rather, they can be tuned by changing parameters in the detection algorithm. In general, one can reduce the false alarm probability at the expense of higher false dismissal probability, and vice versa. This is useful as different applications may require different tuning, e.g. for some applications it may be more important to have low false alarm rate, while others may tolerate more false alarms (i.e. alerts that do not correspond to actual high-risk-lightning) but prefer less false dismissals (i.e. true high-risk-lightning events that do not result in alerts by the algorithm—falsely determining that there is no fire, when there actually is a fire). To accommodate these possibilities, it was determined that the false dismissal probability of the detection algorithm as a function of the false alarm probability, or the so-called receiver operating characteristic (ROC) curve.

In addition to the ROC curve, the delay between ignition (by lightning) and the time of fire detection by the satellite algorithm can be measured. Both satellite and earth-based observations can detect a lightning strike and recover the time of strike with much higher precision (less than one second) than needed for the intended task of the disclosed system and method. The satellite based fire detection can identify the fire once it is sufficiently large given the resolution and sensitivity of the satellite (typically an extent of tens of meters) and when the satellite observes the area of the fire. These two requirements typically can introduce a delay between the start of the fire and its detection and varies between lightning strikes depending both on the environment in which the lightning struck, and the satellites' observing schedule. This delay can also be a function of the false alarm and false dismissal probabilities: setting the sensitivity of the detection algorithm higher can typically reduce the time delay and the false dismissal rate, but at the same time increase the false alarm rate.

To compute the above time delay, for each fire that was associated with a lightning the time difference between the lightning strike and the time of detection can be measured and the delay can be characterized as a function of the false alarm probability, which can help to understand whether allowing for higher false alarm rate achieved lower delays. When determining how the system's results compared to other methods, the obtained delays to the same delays found for CalFire's official reported times for fires associated with lightning strikes can be compared. The results showed that the detection algorithm of the disclosed system has successfully and significantly reduced the delay between ignition and detection for at least some of the co-detected wildfires.

Certain non-limiting benefits, advantages and/or characteristics provided by the novel system and method disclosed herein include:
1. A dual-band ground-based lightning detection network, with two electric field frequency ranges and two-time decay constants. The high-frequency channel enables precise lightning mapping, while the low frequency channel enables the detection of lightning processes that increase the risk of fire ignition.
2. Ground-based location of the detectors allows for detection of lightning current duration, which led to superior results compared to satellite-assisted approaches.
3. Ground-based location of the detectors allows for detection of lightning charge transfer, which led to superior results compared to satellite-assisted approaches.
4. The Ground-Based location of the detectors allows for three-dimensional lightning imaging capabilities.
5. The Ground-Based location of the detectors allows for a dual-band design to provide precise current duration and charge transfer measurements.
6. The system allows for three-dimensional lightning imaging capabilities leading to (a) more precise lightning localization: The lower part of the lightning channel is often not completely vertical, which means that conventional 2D mapping takes an average of the lower part of the lightning channel and reports that as the lightning strike location. The 3D mapping provided for with the disclosed novel system allows for the precise imaging of the location where a lightning stroke attaches to the ground. Precise lightning location information (i.e. down to 30 meters) can enable firefighter and emergency managers to efficiently navigate their crews to the potential ignition spot, and to effectively utilize camera and drones systems for fire reconnaissance; and (b) richer information about the cloud charge structure: 3D imaging leads to richer information about the cloud charge structure that allows for a better understanding of the type and state of the thunderstorm, and it enables the localization of the cloud charge pockets, which is not only important for now-casting, but it also reinforces the charge transfer measurements that are used for the fire ignition risk models.

All measurements, dimensions, shapes, amounts, angles, values, percentages, materials, degrees, configurations, orientations, component layouts and configurations, mechanical/electrical supports, mechanical/electrical connection and connection mechanisms, mechanical/electrical movement or control mechanisms, communication technologies, data sources, product layout, components or parts; component or part locations, sizes, number of sections, number of components or parts, etc. discussed above or shown in the Figures are merely by way of example and are not considered limiting and other measurements, dimensions, shapes, amounts, angles, values, percentages, materials, degrees, configurations, orientations, component layouts and configurations, mechanical/electrical supports, mechanical/electrical connection and connection mechanisms, mechanical/electrical movement or control mechanisms, communication technologies, data sources, product layout, components or parts; component or part locations, sizes, number of sections, number of components or parts, etc. can be chosen and used and all are considered within the scope of the disclosure.

It will be seen that the objects set forth above, and those made apparent from the foregoing description, are efficiently attained and since certain changes may be made in the above construction without departing from the scope of the disclosure, it is intended that all matters contained in the foregoing description shall be interpreted as illustrative and not in a limiting sense. The HRL lightning detection system has been shown and described herein in what is considered to be the most practical and preferred embodiment.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is examined, interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

Dimensions and/or proportions of certain parts in the figures may have been modified and/or exaggerated for the purpose of clarity of illustration and are not considered limiting.

While the HRL lightning detection system and method of use have been described and disclosed in certain terms and has disclosed certain embodiments or modifications, persons skilled in the art who have acquainted themselves with the disclosure, will appreciate that it is not necessarily limited by such terms, nor to the specific embodiments and modifications disclosed herein. Thus, a wide variety of alternatives, suggested by the teachings herein, can be practiced without departing from the spirit of the disclosure, and rights to such alternatives are particularly reserved and considered within the scope of the disclosure.

While preferred embodiments have been shown and described, various modifications and substitutions may be made thereto without departing from the spirit and scope of the disclosure. Accordingly, it is to be understood that the novel HRL lightning detection system and method of use have been described by way of illustrations and not limitation. This description and the accompanying drawings illustrate exemplary embodiments for the system and method. Other embodiments are possible and modifications may be made to the exemplary embodiments without departing from the spirit and scope of the disclosure. It will be apparent to one of ordinary skill in the art that the embodiments as described above may be implemented in many different embodiments of electronics, computer chips, software, circuitry, antennas, sensors, third party data source etc. Therefore, the description and drawings are not meant to limit the disclosure. Instead, the appended claims define the scope of the disclosure.

What is claimed is:

1. A method for determining whether a high-risk-lightning (HRL) strike has occurred, comprising:
    a. detecting electric field signals, by a dual-band electric field detection device located at a fixed location and having a high-frequency antenna and a low-frequency antenna, from an electric field created from a lightning strike at a geographical location within range of the electronic detection device located at the fixed location, the electric field having a waveshape;
    b. recording electric field data, completing pre-processing using edge computing, and forwarding digital information regarding the electric field detected by the electronic detection device including the waveshape to a server or computing system located at a remote location from the fixed location of the electronic detection device; and
    c. calculating the presence of continuing-current (CC) including long-continuing current (LCC) or initial-continuous-current (ICC) using the waveshape of the electric field by the server or computing system;
    wherein detection of the electric field signals by the detection device is independent of the calculating performed by the server or computing system in step c.

2. The method for determining of claim 1 further comprising the step of issuing an alert message or notification by the central processing server when an HRL event is determined to have occurred.

3. The method for determining of claim 1 wherein step b. comprises determining whether the lightning strike was a cloud-to-ground strike or an intracloud pulse strike and calculating one or more current characteristics for the lightning strike if the lightning strike was a cloud-to-ground strike.

4. The method for determining of claim 3 wherein the one or more current characteristics include polarity, peak current amplitude, current duration, maximum rise time, specific energy and charge transfer.

5. The method for determining of claim 1 further comprising the step of determining in real time whether a fire ignition or smoldering has occurred at the area of the HRL event.

6. The method for determining of claim 5 wherein the step of determining in real time whether a fire ignition or smoldering has occurred comprises either:
    (i.) providing latitude and longitude coordinate points, along with an area of a lightning error ellipse to a pan-tilt-zoom camera and focusing the camera to an area corresponding to the area of the lightning error ellipse; or
    (ii) providing latitude and longitude coordinate points, along with the area of the lightning error ellipse to a drone and directing the drone to the area corresponding to the area of the lightning error ellipse.

7. The method for determining of claim 6 wherein the step of determining in real time whether a fire ignition or smoldering has occurred further comprising the step of obtaining a satellite image of the area corresponding to the area of the lightning error ellipse.

8. The method for determining of claim 1, further comprising the step of checking for fire ignition or smoldering at a geographical location where a high risk lightning strike has occurred and detected by the central processing server, wherein the step of checking for fire ignition or smoldering comprising:
    i. using lightning parameters including latitude and longitude coordinate points for the strike point and an error ellipse, determining an area of a lightning error ellipse;
    ii. either focusing a camera in on an area corresponding to the area of the lightning or directing a drone to the area corresponding to the area of the lightning error ellipse; and
    iii. determining whether a fire has ignited or whether there is smoldering at the area corresponding to the lightning error ellipse based on information obtained, processed or seen from the camera or drone.

9. The method for determining of claim 8 wherein the camera is a Pan-Tilt-Zoom camera.

10. The method for determining of 9 wherein step ii. comprises panning, tilting and/or zooming the camera onto the latitude and longitude coordinate points of the detected HRL event.

11. The method for determining of claim 8 further comprising the step of calibrating the camera to true north.

12. The method for determining of claim 8 wherein the camera is automatically zoomed to the area corresponding to the area of the lightning error ellipse by the HRL event detection system.

13. The method for determining of claim 8 further comprising the step of obtaining satellite images from the area corresponding to the lightning error ellipse and use the satellite image as part of the determination analysis in step c.

14. The method for determining of claim 8 wherein step ii. comprises flying the drone to the latitude and longitude coordinate points of the detected HRL event.

15. The method for determining of claim 8 further comprising the step of monitoring or returning to the area of the lightning error ellipse using the camera or drone where a fire ignition or smoldering was determined to have occurred in step iii.

16. The method for determining of claim 8 further comprising the steps of:
    sending or transmitting information representing whether a fire ignition, smoldering or non-ignition was determined in step iii. back to the HRL event detection system; and
    using the information received by the HRL event detection system for training an AI component of the HRL event detection system for use in future detection decisions by the HRL event detection system.

17. The method for determining of claim 1 further comprising the step of creating a 3D lightning mapping file using a time-of-arrival technique.

18. The method for determining of claim 1 wherein step (c) comprises:
    i. receiving lightning parameters for the lightning strike by the server or computing system;
    ii. receiving environmental data for the geographical location by the server or computing system; and
    iii. determining whether an HRL event has occurred by the server or computing system using the received lightning parameters and the received environmental data.

19. The method for determining of claim 18, wherein step iii. comprises determining whether the HRL event has occurred using an artificial intelligence system associated with or in communication with the server or computing system.

20. The method for determining of claim 19, further comprising the step of training or improving the accuracy of a selection program of the artificial intelligence system for distinguishing between igniting and non-igniting lightning strikes, wherein the step of training or improving comprising:
    i. creating a digital file of a fire shape for one or more fires;
    ii. associating one or more lightning strikes in time and space for each fire of the one or more fires;
    iii. retrieving lightning and environmental data for each lightning strike of the one or more lightning strikes;
    iv. retrieving lightning and environmental data for a training set of non-igniting lightning strikes from the one or more lightning strikes; and
    v. using the lightning and environmental data for the non-igniting lightning strikes to improve a selection accuracy when identifying a High Risk Lightning event by the selection program.

21. The method for determining of claim 1 further comprising the step of issuing an alert message or notification by the server or computing system when an HRL event has impacted a power generation system, a wind turbine, a solar panel, a power transmission system or a power distribution system.

22. The method for determining of claim 1 wherein when a lightning strike has been determined to have occurred, further comprising the step of determining whether that lightning strike was of an "upward" type or of a "downward" type.

* * * * *